US007719252B2

(12) United States Patent
Takada et al.

(10) Patent No.: US 7,719,252 B2
(45) Date of Patent: May 18, 2010

(54) POWER SUPPLY

(75) Inventors: Masahiro Takada, Shizuoka (JP);
Toshihiko Ichinose, Nara (JP); Katsumi Kozu, Hyogo (JP); Takeshi Shimamoto, Osaka (JP); Junko Shimamoto, legal representative, Osaka (JP)

(73) Assignee: Panasonic Corporation, Osaka (JP)

( * ) Notice: Subject to any disclaimer, the term of this patent is extended or adjusted under 35 U.S.C. 154(b) by 552 days.

(21) Appl. No.: 11/628,778

(22) PCT Filed: Sep. 16, 2005

(86) PCT No.: PCT/JP2005/017169

§ 371 (c)(1),
(2), (4) Date: Dec. 7, 2006

(87) PCT Pub. No.: WO2006/048978

PCT Pub. Date: May 11, 2006

(65) Prior Publication Data

US 2008/0116873 A1    May 22, 2008

(30) Foreign Application Priority Data

Nov. 2, 2004    (JP)    ............................... 2004-319488

(51) Int. Cl.
*G05F 5/00* (2006.01)
(52) U.S. Cl. ..................................................... 323/299
(58) Field of Classification Search ................. 323/222, 323/271, 282, 299; 320/101
See application file for complete search history.

(56) References Cited

U.S. PATENT DOCUMENTS

| 5,334,463 | A | 8/1994 | Tajima et al. | |
|---|---|---|---|---|
| 5,334,926 | A * | 8/1994 | Imaizumi | 320/104 |
| 5,714,874 | A | 2/1998 | Bonnefoy | |
| 6,590,370 | B1 | 7/2003 | Leach | |
| 7,196,492 | B2 * | 3/2007 | Sugiura et al. | 320/101 |
| 7,362,073 | B2 * | 4/2008 | Lecky | 320/132 |
| 7,436,148 | B2 * | 10/2008 | Saeki et al. | 320/104 |
| 7,446,501 | B2 * | 11/2008 | Aleyraz et al. | 320/101 |
| 7,449,259 | B2 * | 11/2008 | Zhu et al. | 429/23 |

(Continued)

FOREIGN PATENT DOCUMENTS

JP        57-132218 A        8/1982

(Continued)

*Primary Examiner*—Adolf Berhane
*Assistant Examiner*—Yemane Mehari
(74) *Attorney, Agent, or Firm*—McDermott Will & Emery LLP

(57) ABSTRACT

A power supply is provided, which is capable of stabilizing a generated output of the fuel cell using neither a voltage nor a current outputted from the fuel cell as a negative feedback signal. The power supply includes a fuel cell 110, a DC-DC converter 120 that adjusts a voltage outputted from the fuel cell 110 according to a PWM signal and then outputs the voltage to a load device 200, a switching controller 130 that generates the PWM signal and outputs this signal to the DC-DC converter 120, a voltmeter 140 that measures a voltage Vout outputted from the DC-DC converter 120, and a rechargeable battery 150 connected to the load device 200 in parallel. The DC-DC converter 120 calculates a duty ratio of the PWM signal by performing a specific computation using the voltage Vout and a target fuel cell voltage Vt.

23 Claims, 11 Drawing Sheets

U.S. PATENT DOCUMENTS

| | | | |
|---|---|---|---|
| 2004/0076860 A1* | 4/2004 | Aso | 429/23 |
| 2005/0040786 A1* | 2/2005 | Ichinose et al. | 320/101 |
| 2007/0009770 A1* | 1/2007 | Takada et al. | 429/9 |

FOREIGN PATENT DOCUMENTS

| | | |
|---|---|---|
| JP | 2-291668 | 12/1990 |
| JP | 4-51466 A | 2/1992 |
| JP | 5-151983 A | 6/1993 |
| JP | 6-253451 A | 9/1994 |
| JP | 7-153474 A | 6/1995 |
| JP | 9-73328 A | 3/1997 |
| JP | 10-112328 A | 4/1998 |
| JP | 2002-112408 A | 4/2002 |

* cited by examiner ized Application No. PCT/JP2005/017169, filed on Sep. 16, 2005, which in turn claims the benefit of Japanese Application No. 2004-319488, filed on Nov. 2, 2004, the disclosures of which Applications are incorporated by reference herein.

POWER SUPPLY

RELATED APPLICATIONS

This application is the U.S. National Phase under 35 U.S.C. §371 of International Application No. PCT/JP2005/017169, filed on Sep. 16, 2005, which in turn claims the benefit of Japanese Application No. 2004-319488, filed on Nov. 2, 2004, the disclosures of which Applications are incorporated by reference herein.

TECHNICAL FIELD

The present invention relates to a power supply equipped with a fuel cell.

BACKGROUND ART

Recently, as a power supply for an electronic device, such as a notebook computer and a mobile phone, attention has been focused on a fuel cell capable of supplying power continuously for a long period. Various types of fuel cell have been developed, and as a power supply for a mobile electronic device, such as a notebook computer, that demands a reduction in size, a fuel cell of a type that directly supplies power without reforming fuel by a reformer, for example, known as a direct methanol fuel cell (hereinafter, abbreviated as DMFC) shows great promise.

The DMFC includes a fuel circulation type that collects an unused fuel cell from supplied methanol for reuse, and a fuel non-circulation type that does not reuse unused methanol. The fuel circulation type can readily obtain a stable generated output by stabilizing the operating point. It has, however, a drawback that the need for a collecting mechanism (circulation pump or the like) to collect unused methanol complicates the configuration and the device is increased in size. Meanwhile, the fuel non-circulation type can achieve a size reduction of the device because it does not need the collecting mechanism. However, it is not preferable to release a large volume of methanol, which is poisonous. In addition, in terms of enhancing generation efficiency, it is crucial to use up supplied methanol almost completely, that is, to allow supplied methanol to burn completely.

FIG. 11 is a graph showing the current-to-voltage characteristic, the current-to-power characteristic, and the release ratio characteristic for a quantity of supplied methanol (fuel) in the DMFC. Referring to FIG. 11, the ordinate is used for an output voltage (V), output power (W), and a release ratio (%) of the DMFC, and the abscissa is used for an output current (A) of the DMFC. C11 through C13 are the current-to-voltage characteristic curves when quantities of supplied fuel are 0.1 cc/min, 0.2 cc/min, and 0.3 cc/min, respectively. C21 through C23 are the current-to-power characteristic curves when quantities of supplied fuel are 0.1 cc/min, 0.2 cc/min, and 0.3 cc/min, respectively. C31 shows a relation of an output current and a release ratio when a quantity of supplied fuel is 0.3 cc/min. The release ratio is defined as a ratio of released fuel with respect to supplied fuel expressed in percentage.

As is shown in FIG. 11, it is understood that higher output power can be obtained as a quantity of supplied fuel is increased. Also, as are indicated by C11 through C13, it is understood that an output voltage decreases as an output current increases. Further, as is indicated by C31, it is understood that a release ratio decreases as an output current increases.

In the following, an example will be described using a case where a quantity of supplied fuel is 0.3 cc/min. As is indicated by C13, it is understood that the voltage decreases slowly until the output current reaches A3, whereas the voltage decreases abruptly when the output current exceeds A3. Meanwhile, as is indicated by C31, it is understood that the supplied fuel is used up almost completely by the time the output current reaches A3. It is therefore preferable to set the operating point of the fuel cell to a point at which an output current is larger than A3 in terms of allowing the fuel to burn completely. This, however, increases an output current only slightly, and causes the output voltage to decrease abruptly, which makes it impossible to supply a stable output voltage to the load device.

For the fuel non-circulation type, it is therefore required not only to set the operating point in proximity to the power maximum point P, but also to severely control the operating point not to vary. Patent Document 1 discloses a fuel cell voltage generator comprising a DC-DC converter connected to the output side of the fuel cell, a rechargeable battery connected to the output side of the DC-DC converter, and a switch controller that supplies a PWM signal to the DC-DC converter, in which the switch controller calculates a duty ratio of the PWM signal on the basis of a difference between an output voltage of the fuel cell and the reference value.

Also, Patent Document 2 discloses a power supply comprising a fuel cell, a DC converter, a rechargeable battery, and a micro processor that controls the DC converter, in which the maximum value of a current flowing into the DC converter is varied for the voltage of the fuel cell to fall within a specific range including the maximum power.

Patent Document 1: U.S. Pat. No. 6,590,370 B1
Patent Document 2: U.S. Pat. No. 5,714,874

DISCLOSURE OF THE INVENTION

Both the fuel cell voltage generator shown in Patent Document 1 and the power supply shown in Patent Document 2 use a voltage or a current outputted from the fuel cell, that is, a voltage or a current inputted into the DC-DC converter, as a negative feedback signal. This configuration poses a problem that when a voltage needed for the load device increases abruptly and the gain of the DC-DC converter increases abruptly, a voltage outputted from the fuel cell starts to oscillate and the like, which makes a generated output unstable. In addition, because there is a need for circuits, such as a circuit that compares the voltage of the fuel cell with the reference value and a circuit that varies the duty ratio in response to a difference between these two values, another problem arises that the size of the circuitry becomes relatively large.

The invention therefore has an object to provide a power supply capable of stabilizing a generated output of the fuel cell using neither a voltage nor a current outputted from the fuel cell.

A power supply of the invention is characterized by including: a fuel cell; a DC-DC converter that adjusts a voltage outputted from the fuel cell, and then outputs the voltage to a load device connected thereto in parallel; signal generating means for generating a PWM signal that controls the DC-DC converter and outputting the PWM signal to the DC-DC converter; a rechargeable battery connected to the load device in parallel; and voltmeter means for measuring a voltage outputted from the DC-DC converter, wherein the signal generating means calculates a duty ratio of the PWM signal on the basis of a target fuel cell voltage indicating a target value of the voltage outputted from the fuel cell and a measured value of the voltage measured by the voltmeter means.

According to this configuration, a voltage outputted from the fuel cell is adjusted by the DC-DC converter, and then outputted to the load device connected thereto in parallel. The rechargeable battery charged with power outputted from the DC-DC converter is connected to the load device in parallel, and when power for the load device is insufficient, the rechargeable battery covers a shortfall of the power by discharging. A voltage outputted from the DC-DC converter is measured by the voltmeter means. The duty ratio of the PWM signal outputted to the DC-DC converter is calculated on the basis of the measured voltage and the target fuel cell voltage indicating the target value of the voltage outputted from the fuel cell. The DC-DC converter is controlled with the PWM signal having the duty ratio thus calculated. Hence, not only is it possible to obtain power necessary for the load device, but it is also possible to maintain the fuel cell at the constant operating point.

As has been described, because the DC-DC converter is controlled using a voltage outputted from the DC-DC converter without using a voltage outputted from the fuel cell as a negative feedback signal, it is possible to prevent the voltage outputted from the fuel cell from oscillating, which can in turn stabilize a generated output of the fuel cell while supplying the load device with necessary power. In addition, because it is possible to omit circuits, such as a circuit that compares the voltage of the fuel cell with the reference value and a circuit that varies the duty ratio in response to a difference between these values, the size of the circuitry can be reduced.

Also, a power supply of the invention is characterized by including: a fuel cell; a DC-DC converter that adjusts a voltage outputted from the fuel cell, and then outputs the voltage to a load device connected thereto in parallel; signal generating means for generating a PWM signal that controls the DC-DC converter and outputting the PWM signal to the DC-DC converter; a rechargeable battery connected to the load device in parallel; and ammeter means for measuring a current outputted from the DC-DC converter, wherein the signal generating means calculates a duty ratio of the PWM signal on the basis of a target fuel cell current indicating a target value of the current outputted from the fuel cell and a measured value of the current measured by the ammeter means.

According to this configuration, a voltage outputted from the fuel cell is adjusted by the DC-DC converter, and then outputted to the load device connected thereto in parallel. The rechargeable battery charged with power outputted from the DC-DC converter is connected to the load device in parallel, and when power for the load device is insufficient, the rechargeable battery covers a shortfall of the power by discharging. A current outputted from the DC-DC converter is measured by the ammeter means. The duty ratio of the PWM signal outputted to the DC-DC converter is calculated on the basis of the measured current and the target fuel cell current indicating the target value of the current outputted from the fuel cell. The DC-DC converter is controlled with the PWM signal having the duty ratio thus calculated. Hence, not only is it possible to obtain power necessary for the load device, but it is also possible to maintain the fuel cell at the constant operating point.

As has been described, because the DC-DC converter is controlled using a current outputted from the DC-DC converter without using a voltage outputted from the fuel cell as a negative feedback signal, it is possible to prevent the voltage outputted from the fuel cell from oscillating, which can in turn stabilize a generated output of the fuel cell while supplying the load device with necessary power. In addition, because it is possible to omit circuits, such as a circuit that compares the voltage of the fuel cell with the reference value and a circuit that varies the duty ratio in response to a difference between these values, the size of the circuitry can be reduced.

A power supply of the invention is characterized by including: a fuel cell; a DC-DC converter that adjusts a voltage outputted from the fuel cell, and then outputs the voltage to a load device connected thereto in parallel; signal generating means for generating a PWM signal that controls the DC-DC converter and outputting the PWM signal to the DC-DC converter; a rechargeable battery connected to the load device in parallel; voltmeter means for measuring a voltage outputted from the DC-DC converter; and ammeter means for measuring a current outputted from the DC-DC converter, wherein the signal generating means calculates a duty ratio of the PWM signal on the basis of a target fuel cell voltage indicating a target value of the voltage outputted from the fuel cell or a target fuel cell current indicating a target value of the current outputted from the fuel cell, a measured value of the voltage measured by the voltmeter means, and a measured value of the current measured by the ammeter means.

According to this configuration, a voltage outputted from the fuel cell is adjusted by the DC-DC converter, and then outputted to the load device connected thereto in parallel. The rechargeable battery charged with power outputted from the DC-DC converter is connected to the load device in parallel, and when power for the load device is insufficient, the rechargeable battery covers a shortfall of the power by discharging. A voltage and a current outputted from the DC-DC converter are measured by the voltmeter means and the ammeter means, respectively. The duty ratio of the PWM signal outputted to the DC-DC converter is calculated on the basis of the measured voltage and current, and the target fuel cell voltage indicating the target value of the voltage outputted from the fuel cell or the target fuel cell current indicating the target value of the current outputted from the fuel cell. The DC-DC converter is controlled with the PWM signal having the duty ratio thus calculated. Hence, not only is it possible to obtain power necessary for the load device, but it is also possible to maintain the fuel cell at the constant operating point.

As has been described, because the DC-DC converter is controlled using the voltage and the current outputted from the DC-DC converter without using a voltage outputted from the fuel cell as a negative feedback signal, it is possible to prevent the voltage outputted from the fuel cell from oscillating. Then, DC-DC converter can in turn stabilize a generated output of the fuel cell while supplying the load device with necessary power. In addition, because it is possible to omit circuits, such as a circuit that compares the voltage of the fuel cell with the reference value and a circuit that varies the duty ratio in response to a difference between these values, size of the circuitry can be reduced.

BEST MODE FOR CARRYING OUT THE INVENTION

Hereinafter, embodiments concretely showing the best mode for carrying out the invention will be described with reference to the drawings.

First Embodiment

Figure 1:
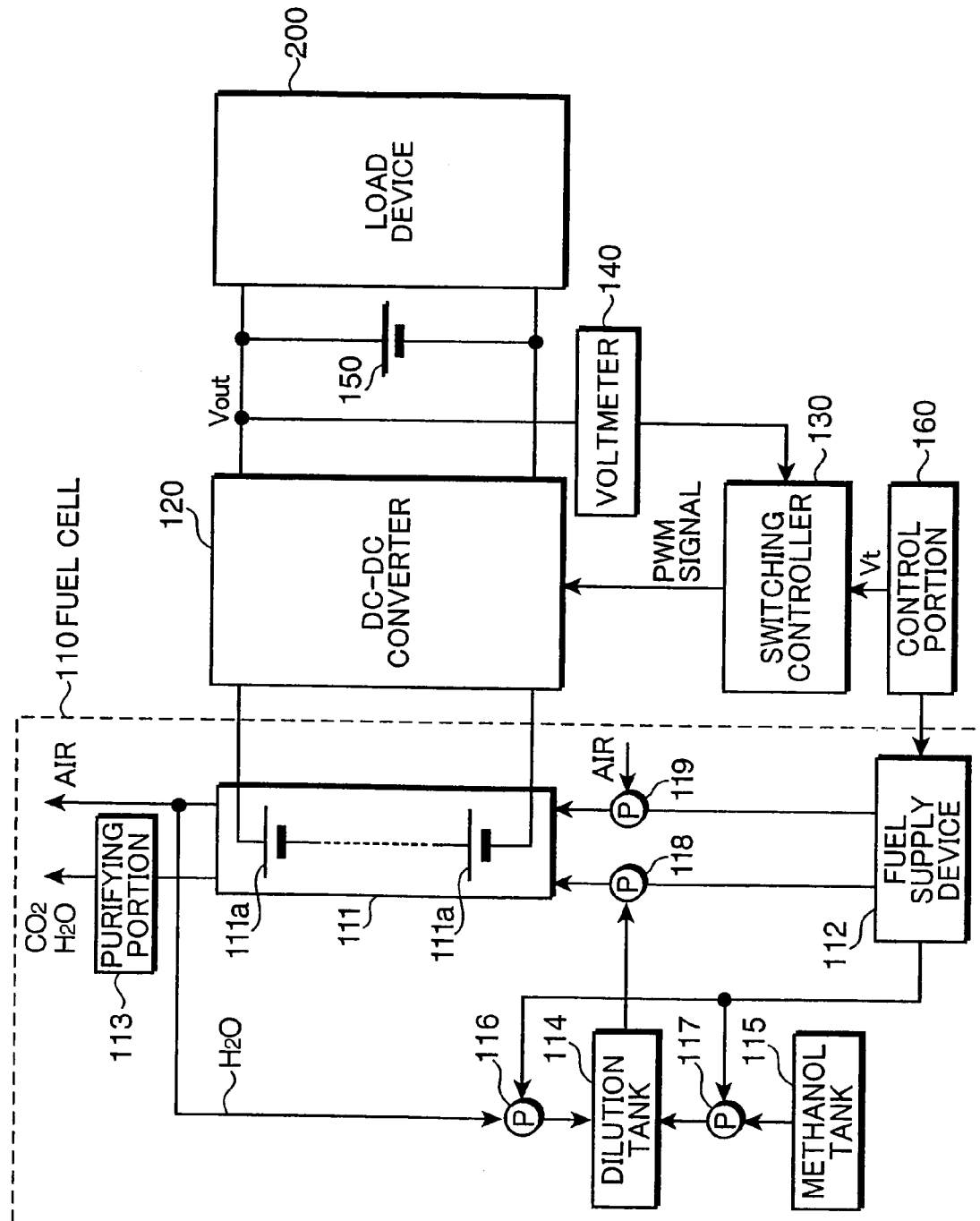
FIG. 1 is block diagram of a power supply according to a first embodiment of the invention.

FIG. 1 is a block diagram of a power supply according to a first embodiment of the invention. As is shown in FIG. 1, the power supply includes a fuel cell 110, a DC-DC converter 120, a switching controller 130, a voltmeter 140, a rechargeable battery 150, and a control portion 160.

The fuel cell 110 has an output terminal connected to an input terminal of the DC-DC converter 120. The DC-DC converter 120 has an output terminal connected to the rechargeable battery 150 and a load device 200 in parallel. The voltmeter 140 is connected between the cathode-side output terminal of the DC-DC converter 120 and the switching controller 130.

The fuel cell 110 is a DMFC of the fuel non-circulation type, and includes a cell stack 111, a fuel supply device 112, a purifying portion 113, a dilution tank 114, a methanol tank 115, and pumps 116 through 119. The fuel supply device 112 adjusts quantities of fuel and air supplied to the fuel cell 110 by controlling the pumps 116 through 119 according to instructions from the control portion 160.

The cell stack 111 comprises one or plural fuel cell-cells 111a connected in series. The fuel cell-cell 111a includes a fuel electrode (anode) to which fuel is supplied and an air electrode (cathode) to which air is supplied. At the fuel electrode, methanol and water are reacted to generate carbon dioxide, hydrogen ions, and electrons ($CH_3OH+H_2O \rightarrow CO_2 + 6H^+ + 6e^-$). At the air electrode, hydrogen ions generated at the fuel electrode and air are reacted to generate water ($3/2O_2 + 6H^+ + 6e^- \rightarrow 3H_2O$). The Gibbs energy generated from this reaction is converted to electric energy for a direct current to be outputted from the fuel cell 110.

The purifying portion 113 changes unconsumed methanol released from the cell stack 111 to carbon dioxide and water to purify unconsumed methanol ($CH_3OH$).

The methanol tank 115 stores methanol at specific concentration. The pump 117 supplies methanol to the dilution tank 114 under the control of the fuel supply device 112. The pump 116 supplies water released from the cell stack 111 to the dilution tank 114 under the control of the fuel supply device 112. The dilution tank 114 stores methanol diluted to specific concentration. The pump 119 supplies air to the cell stack 111 under the control of the fuel supply device 112. The pump 118 supplies methanol stored in the dilution tank 114 to the cell stack 111 under the control of the fuel supply device 112.

The DC-DC converter 120 is a boost type DC-DC converter, which receives a PWM signal outputted from the switching controller 130 and outputs a voltage outputted from the fuel cell 110 to the load device 200 by boosting the voltage outputted from the fuel cell 110 to stay at a pre-set target fuel cell voltage.

The voltmeter 140 comprises an A/D converter, and measures a voltage Vout outputted from the DC-DC converter 120 and outputs this voltage to the switching controller 130. The rechargeable battery 150 is charged by excessive power when power outputted from the DC-DC converter 120 is excessive, and supplies the load device 200 with power to cover a shortfall when power outputted from the DC-DC converter 120 is insufficient. This enables the rechargeable battery 150 to absorb an abrupt variance of power in the load device 200.

The switching controller 130 comprises a CPU, a PWM signal generator, and the like. The controller 130 calculates a duty ratio D of a PWM signal outputted to the DC-DC converter 120 by performing a computation expressed by Equation (1) using a target fuel cell voltage Vt set by the control portion 160 and the voltage Vout, which is measured by the voltmeter 140, outputted from the DC-DC converter 120, thereby generating a PWM signal having the duty ratio D thus calculated.

$$D[\%] = (1 - Vt/Vout) \times 100[\%] \qquad (1)$$

Figure 2:
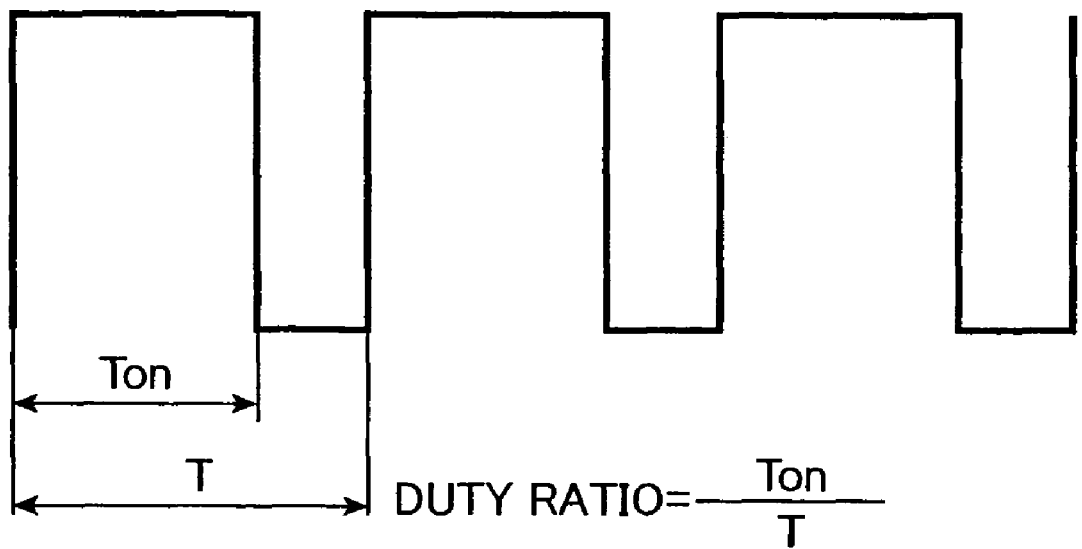
FIG. 2 is a view used to describe a duty ratio.

FIG. 2 is a view used to describe the duty ratio. As is shown in FIG. 2, the duty ratio indicates a ratio of a high level period Ton of a pulse signal with respect to a cycle T of the pulse signal. In the first embodiment, assume that the cycle T of the PWM signal is kept constant. In second through fifteenth embodiments described below, also assume that the cycle T of the PWM signal is kept constant. It should be noted that a most adequate value has been previously set to the cycle T by taking into account the magnitude of a ripple current, the size of the coil, and so forth.

The load device 200 comprises a mobile electronic device, such as a notebook personal computer and a mobile phone. The control portion 160 controls the fuel supply device 112 in such a manner that a constant quantity of methanol is supplied from the dilution tank 114 to the cell stack 111, and the portion 160 also outputs the target fuel cell voltage Vt, which has been set previously in response to a quantity of methanol to be supplied, to the switching controller 130.

To be more specific, the control portion 160 is provided with a memory device (not shown) having stored a target value determination table in which a quantity of supplied methanol is correlated with a target fuel cell voltage pre-set for a supplied quantity, and the portion 160 determines the target fuel cell voltage Vt with reference to this target value determination table.

Figure 11:
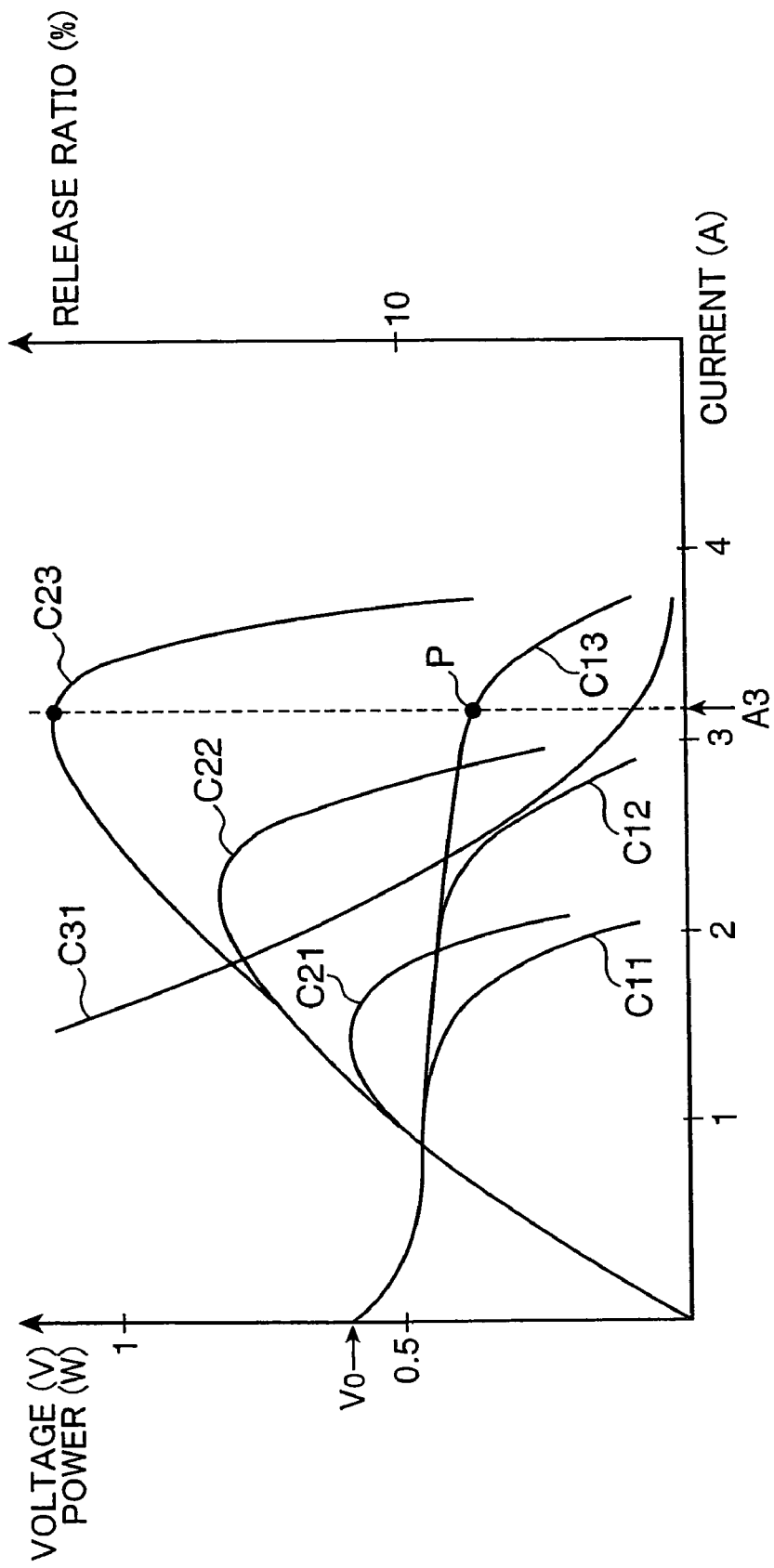
FIG. 11 is a graph showing the current-to-voltage characteristic, the current-to-power characteristic, and the release ratio characteristic for a quantity of supplied methanol (fuel) in a DMFC.

The target value determination table has stored, as the target fuel cell voltage, a voltage having the operating point at the power maximum point P in the current-voltage characteristic curve shown in FIG. 11 specified for each quantity of supplied methanol. The target fuel cell voltage is a value obtained from experiments or the like.

Figure 3:
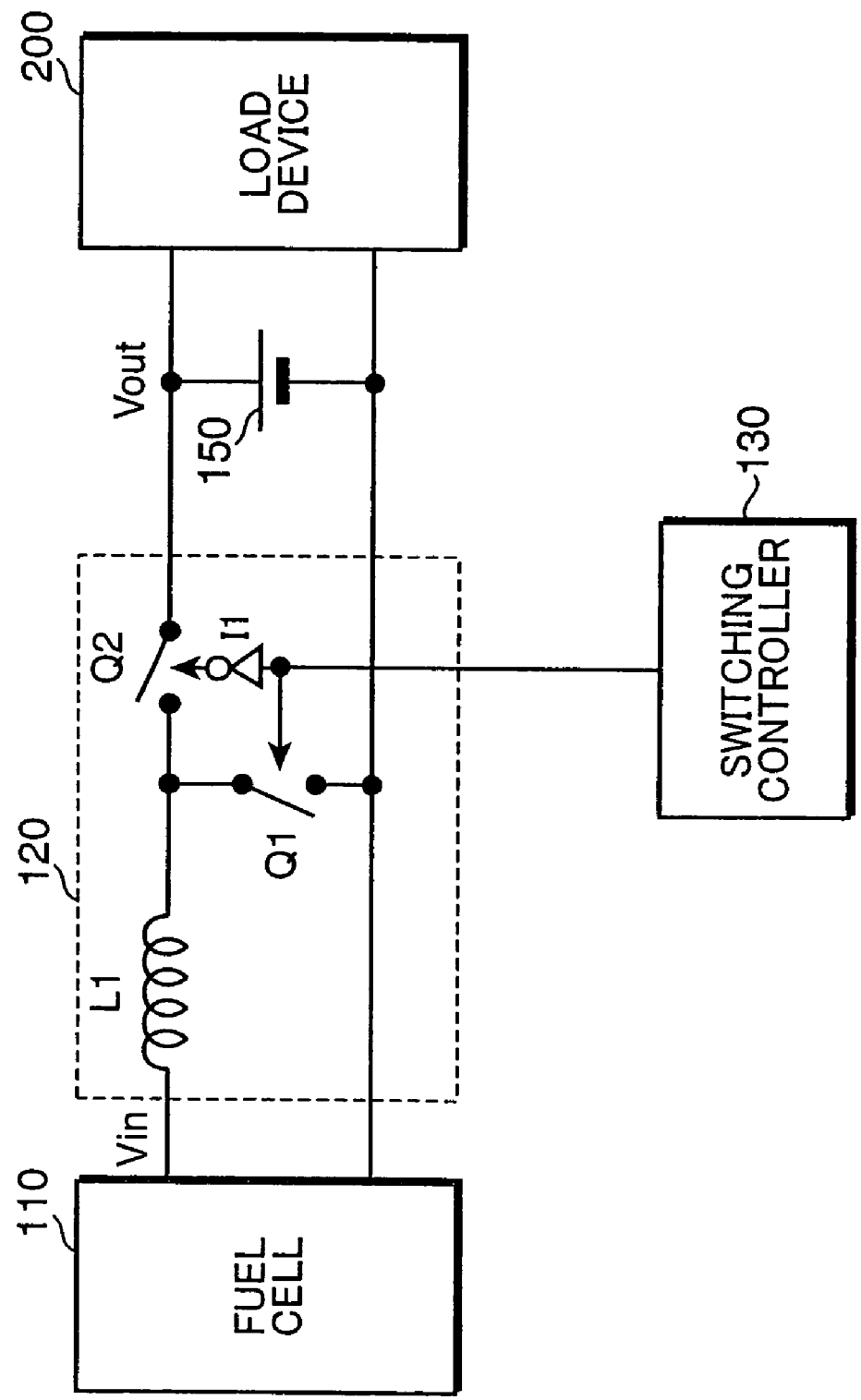
FIG. 3 is a circuit diagram showing the configuration of a boost type DC-DC converter.

FIG. 3 is a circuit diagram showing the configuration of the boost type DC-DC converter. As is shown in FIG. 3, the boost type DC-DC converter includes a coil L1, two switches Q1 and Q2, and an inverting circuit I1. The coil L1 is connected to the cathode of the input terminal of the fuel cell 110 at one end and to the switch Q1 at the other end. The switch Q2 is connected to the coil L1 and the switch Q1 at one end and to the negative electrode of the rechargeable battery 150 at the other end. The switches Q1 and Q2 include a control terminal to which the PWM signal is inputted.

The switches Q1 and Q2 comprise transistors, such as a bipolar transistor and a field-effect transistor, and the switches Q1 and Q2 come ON upon input of a high-level signal at the control terminal and go OFF upon input of a low-level signal. When bipolar transistors are adopted as the switches Q1 and Q2, the base terminal is the control terminal, and when the field-effect transistors are adopted, the gate is the control terminal.

The inverting circuit I1 inverts the logic of the PWM signal by inverting a high-level period of the PWM signal to a low level and a low-level period to a high level, and outputs the resulting signal to the switch Q2. Hence, the switches Q1 and Q2 come ON and go OFF in a complimentary manner so that when one of the transistors comes ON, the other transistor goes OFF.

The boost type DC-DC converter configured as has been described stores energy in the coil L1 when the switch Q1 stays ON, and outputs stored energy by superimposing this energy on the energy of the fuel cell 110 when the switch Q1 stays OFF. The voltage outputted from the fuel cell 110 is thus boosted.

Equation (1) above will now be described. The boost type DC-DC converter 120 shown in FIG. 3 boosts a voltage Vin inputted from the fuel cell 110 to a voltage Vout, and outputs the boosted voltage to the load device 200. The boosting ratio is determined in accordance with Equation (1-1).

$$V\text{out}/V\text{in} = 1/(1-D) \quad (1\text{-}1)$$

To find the duty ratio D from Equation (1-1), we get Equation (1-2).

$$D[\%] = (1 - V\text{in}/V\text{out}) \times 100 \quad (1\text{-}2)$$

As has been described in the background art, in order to take out a generated output without varying the operating point of the fuel cell 110, it is necessary to control the voltage of the fuel cell to stay at a constant level. The voltage Vout is determined by an electromotive force and charging and discharging currents of the rechargeable battery 150.

By replacing Vin in Equation (1-2) with the target fuel cell voltage Vt of the fuel cell, we get Equation (1). Hence, by outputting the PWM signal, whose duty ratio D is calculated in accordance with Equation (1) using the voltage Vout and the target fuel cell voltage Vt of the fuel cell, to the DC-DC converter 120, it is possible to control the voltage Vin from the fuel cell 110 to stay at the target fuel cell voltage Vt, which can in turn stabilize the operating point of the fuel cell 110.

As has been described, according to the power supply of the first embodiment, because the duty ratio D is calculated by measuring the voltage Vout outputted from the DC-DC converter 120 without using a voltage outputted from the fuel cell 110 as a negative feedback signal, it is possible to prevent the voltage outputted from the fuel cell from oscillating and thereby becoming unstable. This makes it possible to stabilize a generated output of the fuel cell while supplying necessary power to the load device 200. In addition, the number of components can be reduced because the A/D converter is used as the voltmeter 140 and the CPU as the switching controller 130.

Incidentally, in the boost type DC-DC converter in the related art, a rectifying device, such as a diode, is used as the switch Q2. In this case, a current flowing through the coil L1 does not change continuously when the current flowing through the coil L1 becomes small. When the current flowing through the coil L1 does not change continuously, Equation (1-1) is not established. It is therefore impossible to control the voltage outputted from the fuel cell 110 to stay at a constant level even when the duty ratio D is determined in accordance with Equation (1).

On the contrary, as is shown in FIG. 3, by adopting the switching element as the switch Q2, the current flowing through the coil L1 keeps changing continuously. It is thus possible to control the voltage outputted from the fuel cell 110 to stay at a constant level with the use of the PWM signal set to have the duty ratio D calculated in accordance with Equation (1).

Second Embodiment

Figure 4:
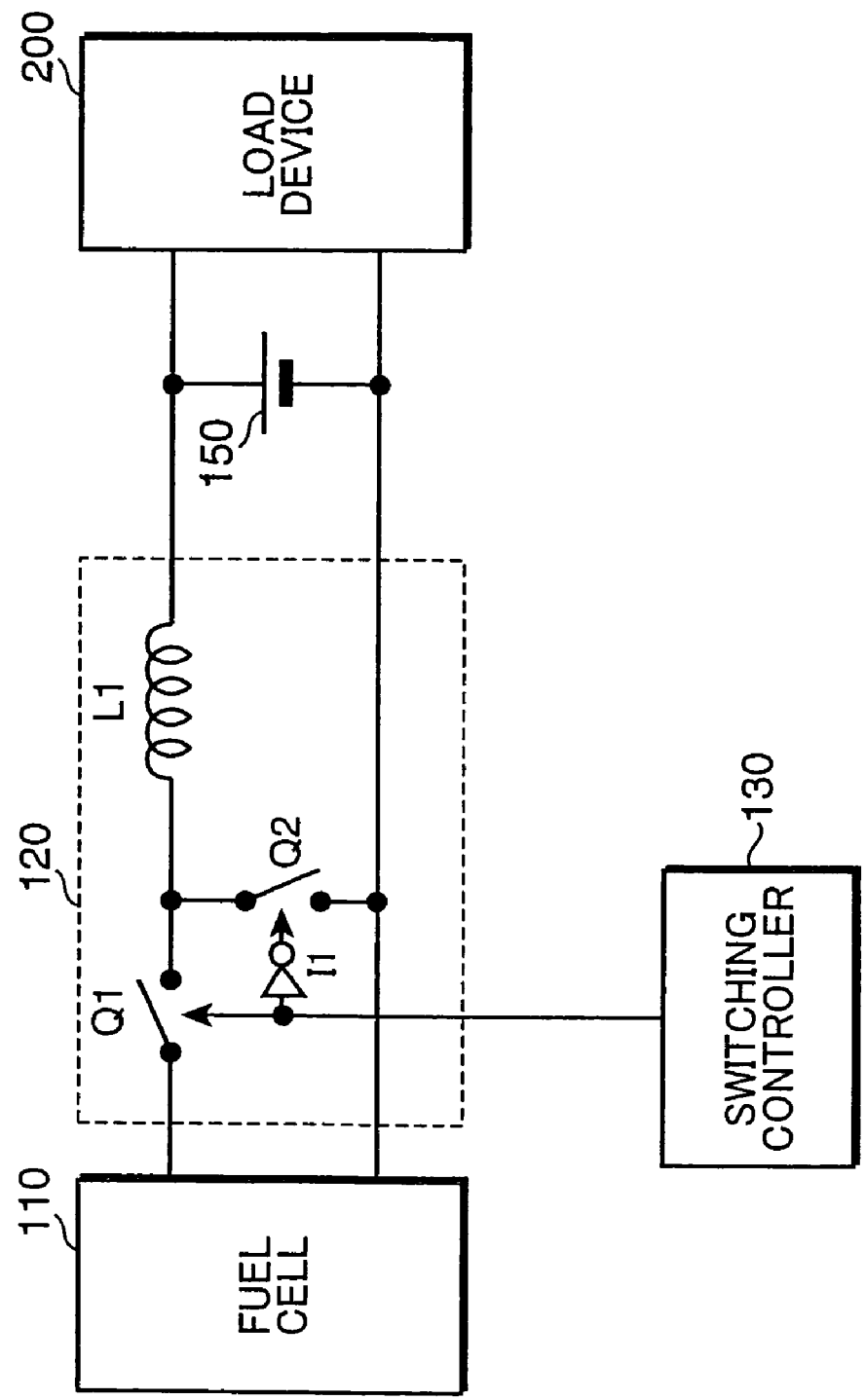
FIG. 4 is a circuit diagram showing the configuration of a buck type DC-DC converter.

The power supply according to a second embodiment will now be described. Because the overall configuration of the power supply of the second embodiment is the same as the overall configuration of the power supply of the first embodiment, descriptions will be given using FIG. 1. The power supply of the second embodiment is characterized by using a buck type DC-DC converter as the DC-DC converter 120 in the power supply of the first embodiment. FIG. 4 is a circuit diagram showing the configuration of the buck type DC-DC converter. The buck type DC-DC converter includes a coil L1, two switches Q1 and Q2, and an inverting circuit I1. In FIG. 4, the same elements are labeled with the same reference numerals with respect to FIG. 3, and descriptions of these elements are omitted.

The switch Q1 is connected to the cathode-side output terminal of the fuel cell 110 at one end and to the switch Q2 and the coil L1 at the other end. The coil L1 is connected to the negative electrode of the rechargeable battery 150 at one end. The switch Q2 is connected to the anode-side output terminal of the fuel cell 110 and the positive electrode of the rechargeable battery 150 at one end. The inverting circuit I1 circuit I1 is connected between the switching controller 130 and the control terminal of the switch Q2. The switches Q1 and Q2 come ON and go OFF in a complementary manner with the PWM signal in the same manner as the switches Q1 and Q2 shown in FIG. 3. The buck type DC-DC converter configured in this manner steps down the voltage inputted from the fuel cell 110, and outputs this voltage toward the load device 200.

In a case where the buck type DC-DC converter is used as the DC-DC converter 120, the switching controller 130 performs a computation in accordance with Equation (2) to calculate the duty ratio D of the PWM signal.

$$D[\%] = (Vt/V\text{out}) \times 100 \quad (2)$$

where D is the duty ratio, Vout is the voltage Vout measured by the voltmeter 140, and Vt is the target fuel cell voltage Vt set by the control portion 160.

As has been described, according to the power supply of the second embodiment, because the duty ratio D of the PWM signal is calculated in accordance with Equation (2) and the switch Q2 is connected, it is possible to achieve the same advantages achieved by the power supply of the first embodiment when the buck type DC-DC converter is used.

Third Embodiment

Figure 5:
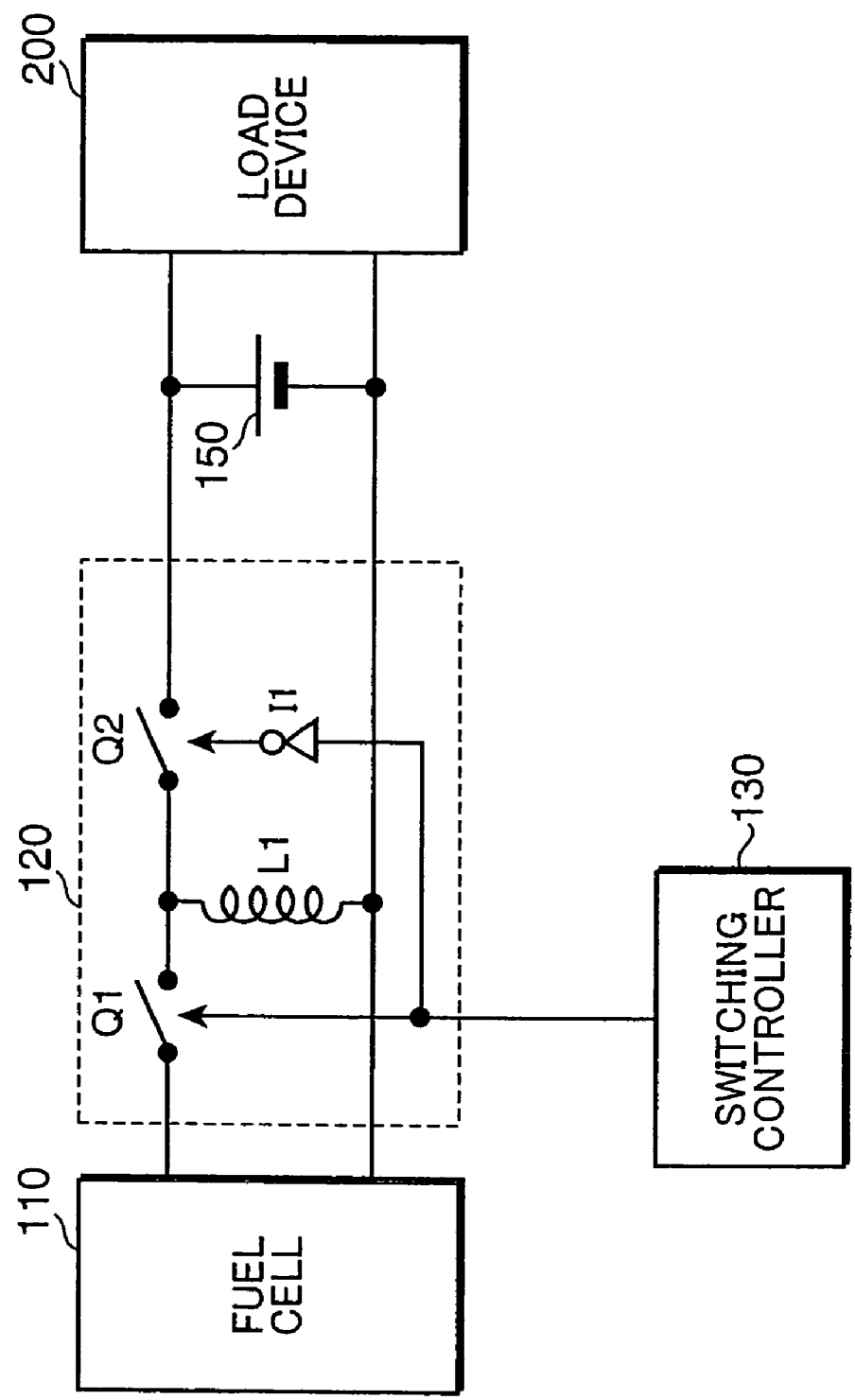
FIG. 5 is a circuit diagram showing the configuration of an inverter type DC-DC converter.

The power supply according to a third embodiment will now be described. Because the overall configuration of the power supply of the third embodiment is the same as the overall configuration of the power supply of the first embodiment, descriptions will be given using FIG. 1. The power supply of the third embodiment is characterized by using an inverter type DC-DC converter as the DC-DC converter 120 in the power supply of the first embodiment. FIG. 5 is a circuit diagram showing the configuration of the inverter type DC-DC converter. In FIG. 5, the same elements are labeled with the same reference numerals with respect to FIG. 3, and descriptions of these elements are omitted. As is shown in FIG. 5, the inverter type DC-DC converter includes two switches Q1 and Q2, a coil L1, and an inverting circuit I1.

The switch Q1 is connected to the cathode of the fuel cell 110 at one end and to the coil L1 and the switch Q2 at the other end. The switch Q2 is connected to the negative electrode of the rechargeable battery 150 at one end. The coil L1 is connected to the anode-side output terminal of the fuel cell 110 and the positive electrode of the rechargeable battery 150 at one end. The inverting circuit I1 is connected between the control terminal of the switch Q2 and the switching controller 130.

In a case where the inverter type DC-DC converter is used as the DC-DC converter 120, the switching controller 130 performs a computation expressed by Equation (3) to calculate the duty ratio D of the PWM signal.

$$D[\%]=(1/(1-Vt/Vout))\times 100 \qquad (3)$$

where Vout is the voltage measured by the voltmeter 140, and Vt is the target fuel cell voltage Vt set by the control portion 160.

As has been described, according to the power supply of the third embodiment, because the duty ratio D of the PWM signal is calculated in accordance with Equation (3) and the switch Q2 is connected, it is possible to achieve the same advantages achieved by the power supply of the first embodiment when the inverter type DC-DC converter is used.

Fourth Embodiment

The power supply according to a fourth embodiment will now be described. Because the overall configuration of the power supply of the fourth embodiment is the same as the overall configuration of the power supply of the first embodiment, descriptions will be given using FIG. 1. The power supply of the fourth embodiment is characterized by using a SEPIC type DC-DC converter as the DC-DC converter 120 in the power supply of the first embodiment.

Figure 6:
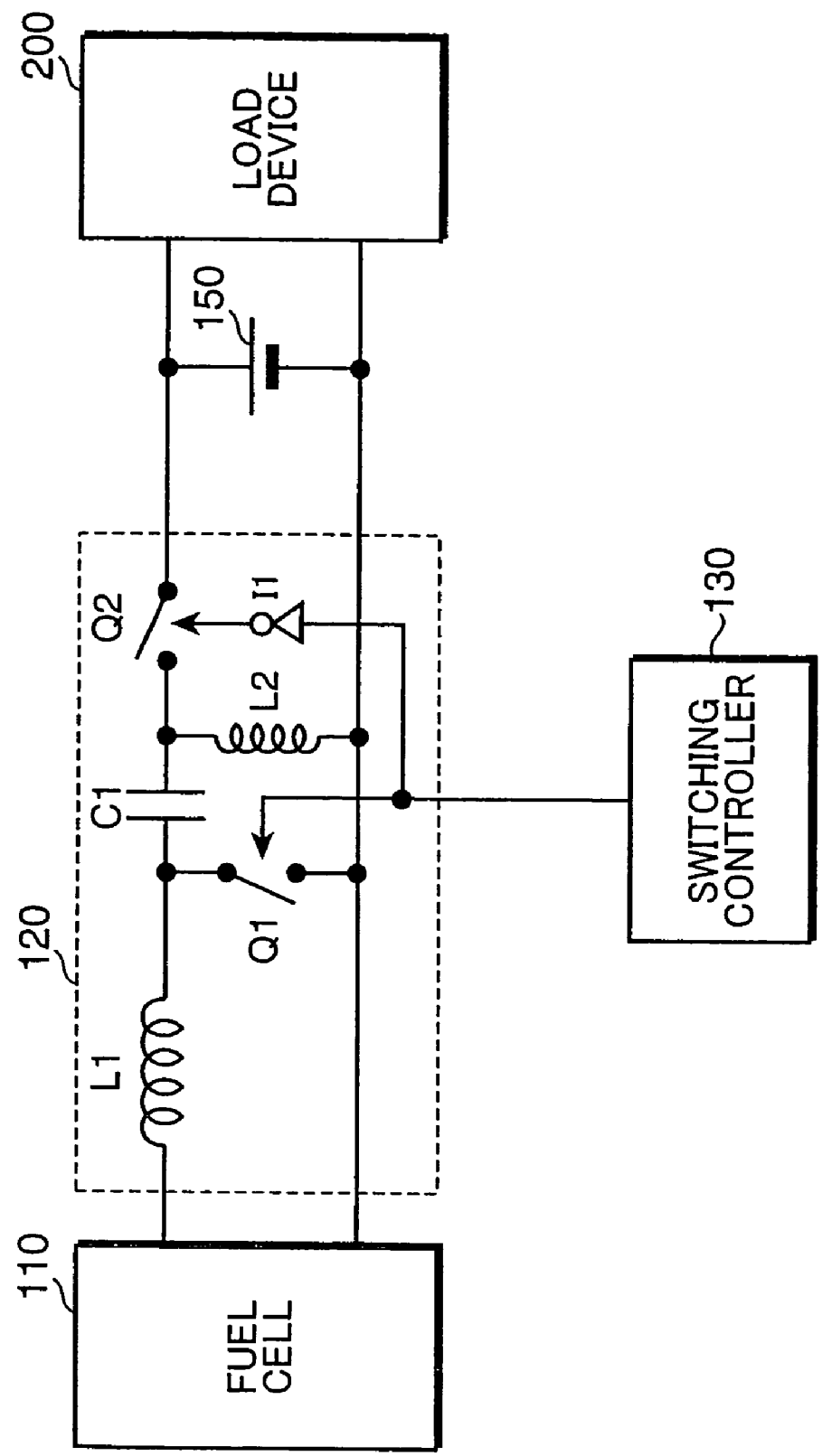
FIG. 6 is a circuit diagram showing the configuration of a SEPIC type DC-DC converter.

FIG. 6 is a circuit diagram showing the configuration of the SEPIC type DC-DC converter. As is shown in FIG. 6, the SEPIC type DC-DC converter includes two switches Q1 and Q2, coils L1 and L2, a capacitor C1, and an inverting circuit I1.

The coil L1 is connected to the cathode of the fuel cell 110 at one end and to the switch Q1 and the capacitor C1 at the other end. The capacitor C1 is connected to the coil L2 and the switch Q2 at one end. Both the switch Q1 and the coil L2 are connected to the anode-side output terminal of the fuel cell 110 and the positive electrode of the rechargeable battery 150 at one end. The inverting circuit I1 is connected between the control terminal of the switch Q2 and the switching controller 130. The switches Q1 and Q2 come ON and go OFF in a complementary manner with the PWM signal.

In a case where the SEPIC type DC-DC converter is used, the switching controller 130 performs a computation expressed by Equation (4) to calculate the duty ratio D of the PWM signal.

$$D[\%]=(1/(1+Vt/Vout))\times 100[\%] \qquad (4)$$

where Vout is the voltage Vout measured by the voltmeter 140, and Vt is the target fuel cell voltage Vt set by the control portion 160.

As has been described, according to the power supply of the fourth embodiment, because the duty ratio D of the PWM signal is calculated in accordance with Equation (4) and the switch Q2 is connected, it is possible to achieve the same advantages achieved by the power supply of the first embodiment when the SEPIC type DC-DC converter is used.

Fifth Embodiment

Figure 7:
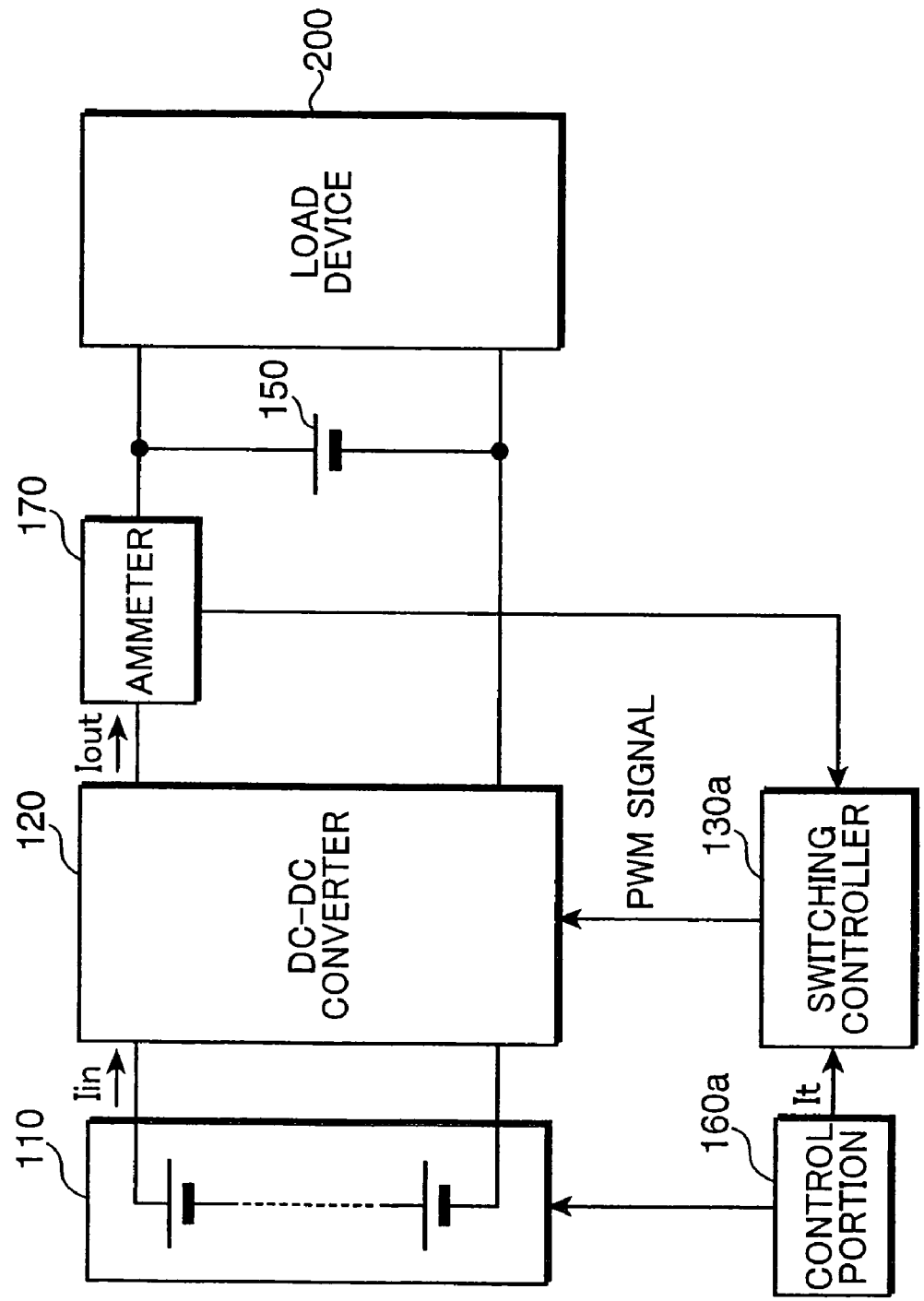
FIG. 7 is a block diagram showing the configuration of the power supply according to a fifth embodiment.

The power supply according to a fifth embodiment of the invention will now be described. FIG. 7 is a block diagram showing the configuration of the power supply of the fifth embodiment. The power supply of the fifth embodiment is characterized by including an ammeter 170 instead of the voltmeter 140 in the power supply of the first embodiment, and by calculating the duty ratio D of the PWM signal using a current Iout outputted from the DC-DC converter 120 and a pre-set target fuel cell current It of the fuel cell 110. In FIG. 7, the same components are labeled with the same reference numerals with respect to the power supply of the first embodiment, and descriptions of these components are omitted. Also, the cell stack 111 alone is shown for the fuel cell 110 and the other members are not shown in the drawing.

The ammeter 170 is connected between the cathode-side output terminal of the DC-DC converter 120 and the switching controller 130a, so that the ammeter 170 measures a current outputted from the DC-DC converter 120 and outputs this current to the switching controller 130a. The ammeter 170 comprises an A/D converter or the like.

The DC-DC converter 120 comprises the boost type DC-DC converter shown in FIG. 3. The control portion 160a sets the target fuel cell current It that has been set previously in response to a quantity of methanol to be supplied to the cell stack 111, and outputs this value to the switching controller 130a. To be more specific, the portion 160a includes a memory device (not shown) having stored a target value determination table in which a quantity of supplied methanol is correlated with the target fuel cell current It pre-set for a supplied quantity, and determines the target fuel cell current It with reference to this target value determination table. As with the power supply of the first embodiment, the target value determination table has stored a current such that sets the operating point of the fuel cell 110 to the power maximum point as the target fuel cell current It.

The switching controller 130a calculates the duty ratio D of the PWM signal to be outputted to the DC-DC converter 120 by performing a computation expressed by Equation (5) using the current Iout measured by the ammeter 170 and the target fuel cell current It set by the control portion 160a, thereby generating the PWM signal having the calculated duty ratio D thus generated.

$$D[\%]=(1-Iout/It)\times 100[\%] \qquad (5)$$

By outputting the PWM signal having the duty ratio D calculated in accordance with Equation (5) to the DC-DC converter 120, it is possible to control the fuel cell 110 in such a manner that the current Iin outputted from the fuel cell 110 stays at the target fuel cell current It while supplying necessary power to the load device 200. A generated output of the fuel cell can be thus stabilized by stabilizing the operating point of the fuel cell 110.

Equation (5) will now be described. The power conversion efficiency η of the DC-DC converter 120 is defined by Equation (5-1).

$$\eta = \text{output power}/\text{input power} \qquad (5\text{-}1)$$
$$= (Vout \times Iout)/(Vin \times Iin)$$

The power conversion efficiency η is normally equal to or smaller than 1, and indicates a power loss of the DC-DC converter 120. The power loss is attributed to a power loss or the like caused by resistance of the switches and the coil. The power conversion efficiency η can be specified by a function using the current Iin outputted from the fuel cell 110 as an argument.

Equation (5-1) is modified to Equation (5-2).

$$Iout/Iin = \eta \times (Vin/Vout) \qquad (5\text{-}2)$$

By substituting Equation (1-1) into Vout/Vin in the right side of Equation (5-2) and multiplying the both sides by 100, we get Equation (5-3).

$$D(\%) = (1 - Iout/(\eta \times Iin)) \times 100 \qquad (5\text{-}3)$$

By replacing the current Iin in Equation (5-3) with the target fuel cell current It, we get Equation (5-4).

$$D(\%) = (1 - Iout/(\eta \times It)) \times 100 \qquad (5\text{-}4)$$

Given η=1 in Equation (5-4), then we get Equation (5).

As has been described, according to the power supply of the fifth embodiment, because the duty ratio D is calculated in accordance with Equation (5) and the switch Q2 is connected, it is possible to achieve the same advantages achieved in the first embodiment even when the boost type DC-DC converter is adopted and the duty ratio is calculated using the current Iout outputted from the DC-DC converter 120.

Sixth Embodiment

The power supply according to a sixth embodiment will now be described. Because the overall configuration of the power supply of the sixth embodiment is the same as the overall configuration of the power supply of the sixth embodiment, descriptions will be given using FIG. 7. The power supply of the sixth embodiment is characterized by using a buck type DC-DC converter shown in FIG. 4 as the DC-DC converter 120 in the power supply of the fifth embodiment.

The switching controller 130*a* performs a computation in accordance with Equation (6) to calculate the duty ratio D of the PWM signal.

$$D[\%] = (Iout/It) \times 100 \qquad (6)$$

As has been described, according to the power supply of the sixth embodiment, because the duty ratio D of the PWM signal is calculated in accordance with Equation (6) and the switch Q2 is connected, it is possible to achieve the same advantages achieved by the power supply of the first embodiment even when the buck type DC-DC converter is used and the duty ratio D is calculated using the current Iout outputted from the DC-DC converter 120.

Seventh Embodiment

The power supply according to a seventh embodiment will now be described. Because the overall configuration of the power supply of the seventh embodiment is the same as the overall configuration of the power supply of the fifth embodiment, descriptions will be given using FIG. 7. The power supply of the seventh embodiment is characterized by using an inverter type DC-DC converter shown in FIG. 5 as the DC-DC converter 120 in the power supply of the fifth embodiment.

The switching controller 130*a* performs a computation in accordance with Equation (7) to calculate the duty ratio D of the PWM signal.

$$D[\%] = (1/(1 - Iout/It)) \times 100[\%] \qquad (7)$$

As has been described, according to the power supply of the seventh embodiment, because the duty ratio D of the PWM signal is calculated in accordance with Equation (7) and the switch Q2 is connected, it is possible to achieve the same advantages achieved by the power supply of the first embodiment even when the inverter type DC-DC converter is used and the duty ratio D is calculated using the current Iout outputted from the DC-DC converter 120.

Eighth Embodiment

The power supply according to an eighth embodiment will now be described. Because the overall configuration of the power supply of the eighth embodiment is the same as the overall configuration of the power supply of the fifth embodiment, descriptions will be given using FIG. 7. The power supply of the eighth embodiment is characterized by using a SEPIC type DC-DC converter shown in FIG. 6 as the DC-DC converter 120 in the power supply of the fifth embodiment.

The switching controller 130*a* performs a computation in accordance with Equation (8) to calculate the duty ratio D of the PWM signal.

$$D[\%] = (1/(1 + Iout/It)) \times 100 \qquad (8)$$

It should be noted that Equation (8) is derived from Equation (5-1) and Equation (4) as with Equation (5).

As has been described, according to the power supply of the eighth embodiment, because the duty ratio D of the PWM signal is calculated in accordance with Equation (8) and the switch Q2 is connected, it is possible to achieve the same advantages achieved by the power supply of the first embodiment even when the SEPIC type DC-DC converter is used and the duty ratio D is calculated using the current Iout outputted from the DC-DC converter 120.

Ninth Embodiment

The power supply according to a ninth embodiment will now be described. The power supply of the ninth embodiment is characterized by calculating the duty ratio D by further taking the power conversion efficiency η into account in the power supply of the fifth embodiment.

Figure 8:
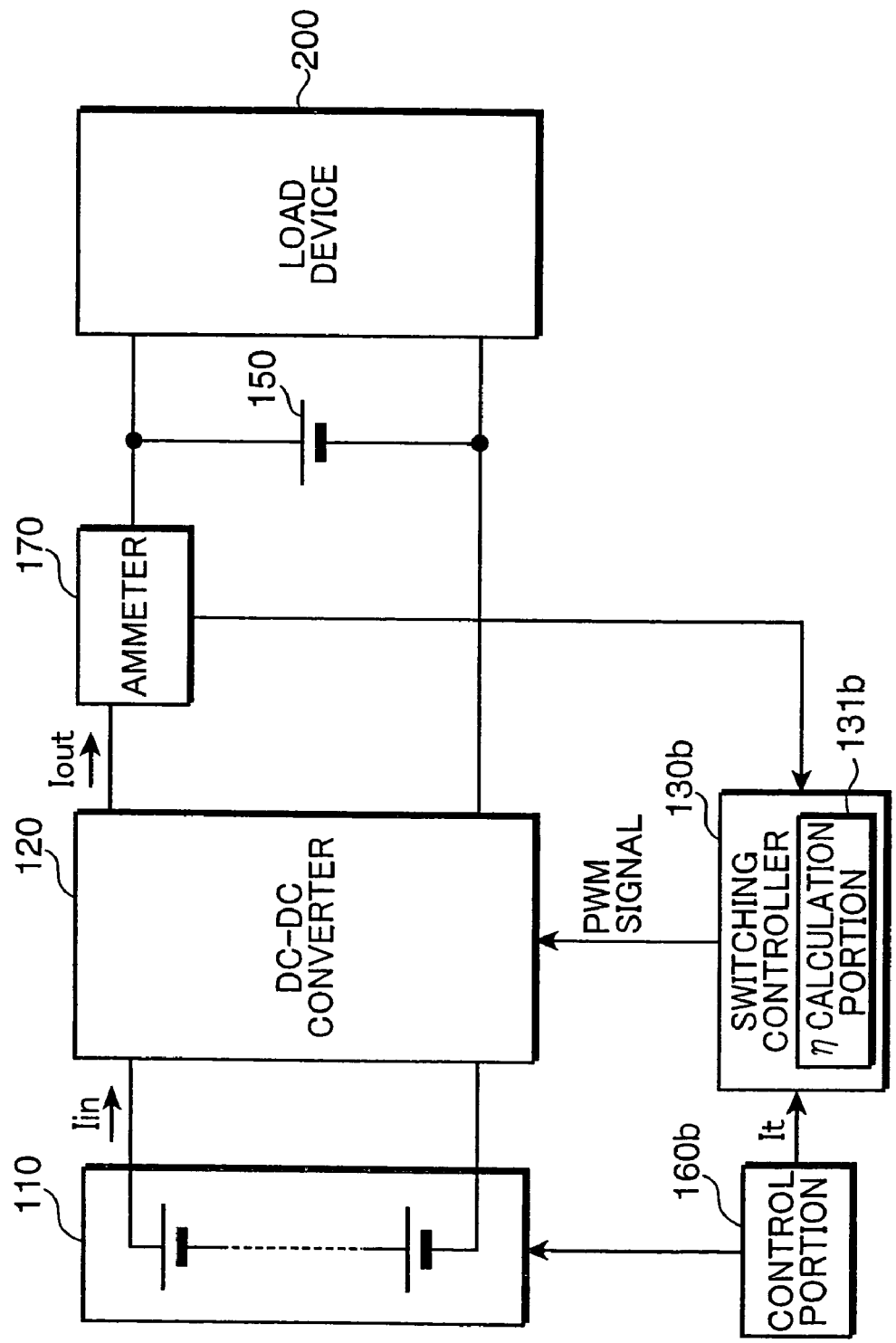
FIG. 8 is a block diagram showing the configuration of the power supply according to a ninth embodiment.

FIG. 8 is a block diagram showing the overall configuration of the power supply of the ninth embodiment. In FIG. 8, the same components are labeled with the same reference numerals with respect to FIG. 7, and descriptions of these components are omitted.

The switching controller 130*b* includes an η calculation portion 131*b*. The η calculation portion 131*b* calculates the power conversion efficiency η of the DC-DC converter 120. The power conversion efficiency η is expressed by a specific function using the target fuel cell current It as an argument. The η calculation portion 131*b* therefore calculates the power conversion efficiency η by substituting the target fuel cell current It set by the control portion 160*b* into the specific function. Alternatively, a conversion table indicating the relation of the target fuel cell current It and the power conversion efficiency η with respect to the target fuel cell current It may be stored in a memory device (not shown), so that the η calculation portion 131*b* specifies the power conversion efficiency η using this conversion table.

The DC-DC converter 120 comprises a boost type DC-DC converter shown in FIG. 3. The switching controller 130*b* calculates the duty ratio D of the PWM signal by performing a computation in accordance with Equation (9) using the target fuel cell current It set by the control portion 160*b* and the current Iout measured by the ammeter 170.

$$D(\%) = (1 - Iout/(\eta \times It)) \times 100 \tag{9}$$

As has been described, according to the ninth embodiment, because the duty ratio D of the PWM signal is calculated by taking the power conversion efficiency η into account, in addition to the advantages achieved in the first embodiment, it is possible to generate the PWM signal, for which a power loss caused by resistance of the transistor and the coil has been corrected. This configuration can in turn make a generated output of the fuel cell more stable.

Tenth Embodiment

The power supply according to a tenth embodiment will now be described. Because the overall configuration of the power supply of the tenth embodiment is the same as the overall configuration of the power supply of the ninth embodiment, descriptions will be given using FIG. 8. The power supply of the tenth embodiment is characterized by using a buck type DC-DC converter shown in FIG. 4 as the DC-DC converter 120 in the power supply of the ninth embodiment.

The switching controller 130*b* performs a computation in accordance with Equation (10) to calculate the duty ratio D of the PWM signal.

$$D[\%] = (Iout/\eta It) \times 100 \tag{10}$$

As has been described, according to the power supply of the tenth embodiment, because the duty ratio D of the PWM signal is calculated in accordance with Equation (10) and the switch Q2 is connected, it is possible to achieve the same advantages achieved by the power supply of the ninth embodiment when the buck type DC-DC converter is used.

Eleventh Embodiment

The power supply according to an eleventh embodiment will now be described. Because the overall configuration of the power supply of the eleventh embodiment is the same as the overall configuration of the power supply of the ninth embodiment, descriptions will be given using FIG. 8. The power supply of the eleventh embodiment is characterized by using an inverter type DC-DC converter shown in FIG. 5 as the DC-DC converter 120 in the power supply of the ninth embodiment.

The switching controller 130*b* performs a computation in accordance with Equation (11) to calculate the duty ratio D of the PWM signal.

$$D[\%] = (1/(1 - Iout/\eta It)) \times 100 \tag{11}$$

As has been described, according to the power supply of the eleventh embodiment, because the duty ratio D of the PWM signal is calculated in accordance with Equation (11) and the switch Q2 is connected, it is possible to achieve the same advantages achieved by the power supply of the ninth embodiment when the inverter type DC-DC converter is used.

Twelfth Embodiment

The power supply according to a twelfth embodiment will now be described. Because the overall configuration of the power supply of the twelfth embodiment is the same as the overall configuration of the power supply of the ninth embodiment, descriptions will be given using FIG. 8. The power supply of the twelfth embodiment is characterized by using a SEPIC type DC-DC converter shown in FIG. 6 as the DC-DC converter 120 in the power supply of the ninth embodiment.

The switching controller 130*b* performs a computation in accordance with Equation (12) to calculate the duty ratio D of the PWM signal.

$$D[\%] = (1/(1 + Iout/\eta It)) \times 100 \tag{12}$$

As has been described, according to the power supply of the twelfth embodiment, because the duty ratio D of the PWM signal is calculated in accordance with Equation (12) and the switch Q2 is connected, it is possible to achieve the same advantages achieved by the power supply of the ninth embodiment when the SEPIC type DC-DC converter is used.

Thirteenth Embodiment

The power supply according to a thirteenth embodiment will now be described. The power supply of the thirteenth embodiment is characterized by adopting a flyback type DC-DC converter as the DC-DC converter.

Figure 9:
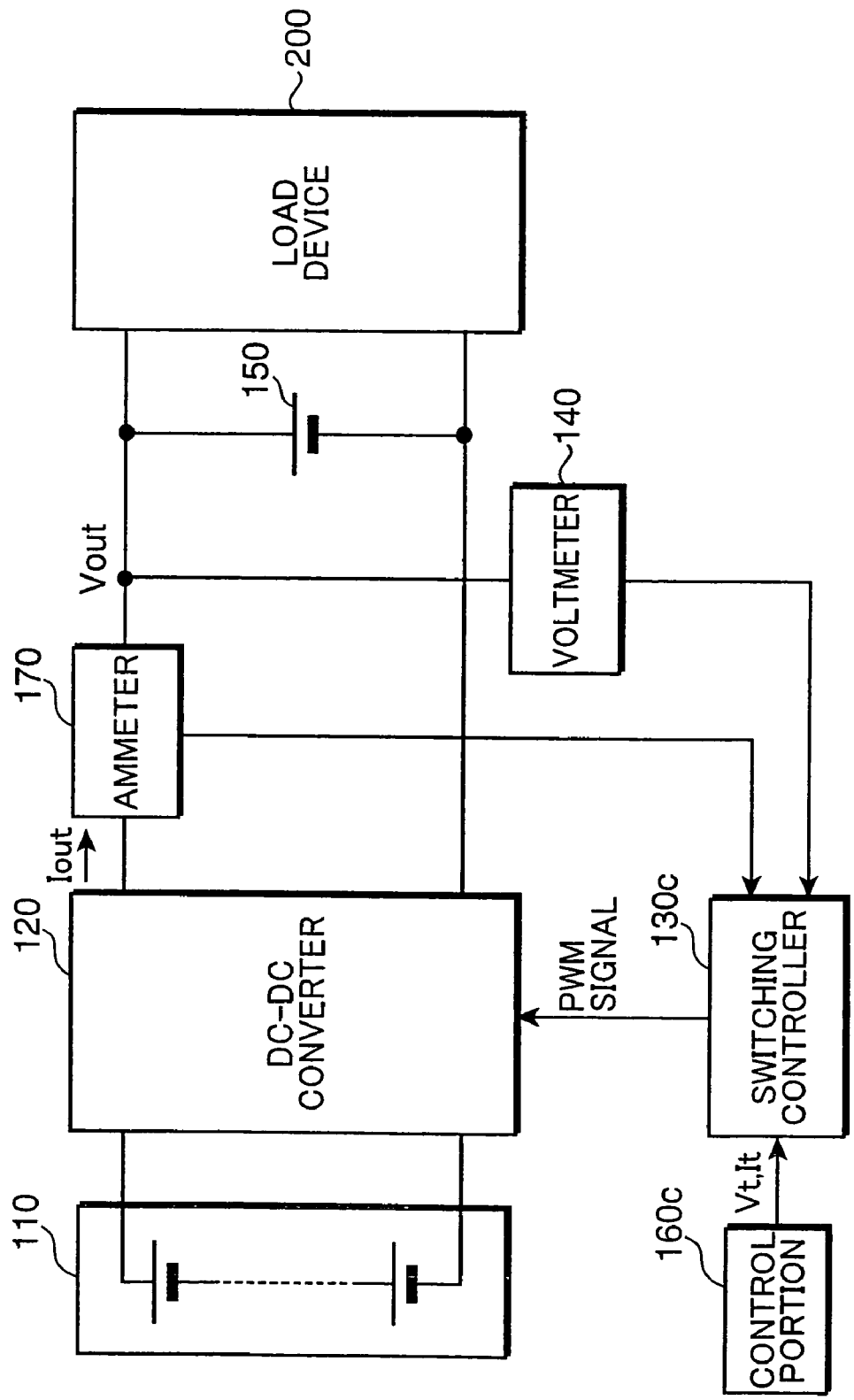
FIG. 9 is a block diagram showing the configuration of the power supply according to a thirteenth embodiment.

FIG. 9 is a block diagram showing the configuration of the power supply of the thirteenth embodiment. As is shown in FIG. 9, the power supply includes a voltmeter 140 and an ammeter 170. Because the connection relations and the functions of the both measuring instruments are the same as described in the first and fifth embodiments, descriptions are omitted.

Figure 10:
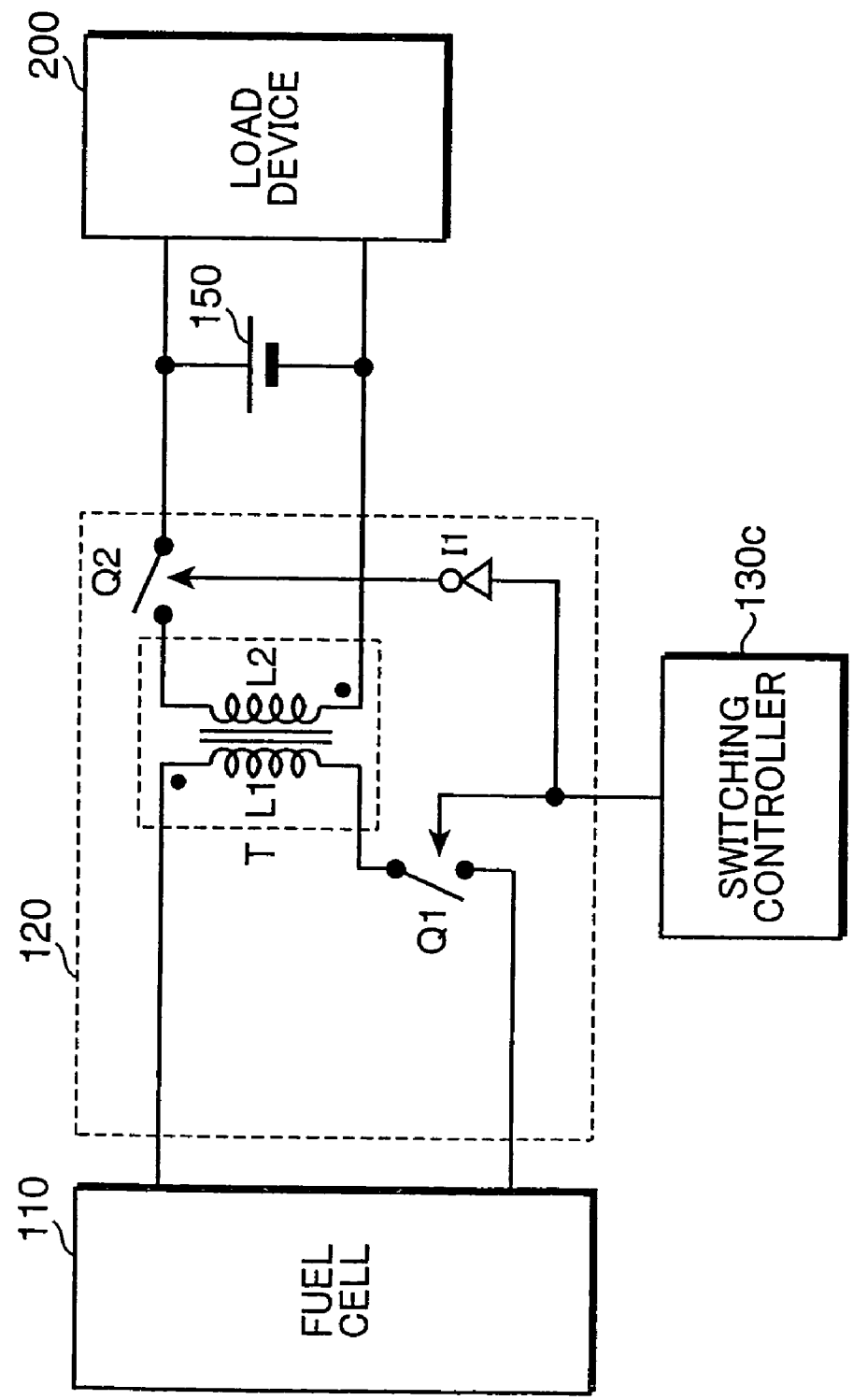
FIG. 10 is a circuit diagram showing the configuration of a flyback type DC-DC converter.

The switching controller 130*c* calculates the duty ratio D of the PWM signal by performing a computation in accordance with Equation (13) using the voltage Vout measured by the voltmeter 140, the current Iout measured by the ammeter 170, and the target fuel cell voltage Vt set by the control portion 160*c*.

$$D(\%) = (Vout/Vt) \times [(2 \times L \times Iout/(Vout \times T))]^{1/2} \times 100 \tag{13}$$

where D is the duty ratio D, L is an inductance of the primary coil L1 in the flyback type DC-DC converter shown in FIG. 10, and T is a cycle of the PWM signal.

FIG. 10 is a circuit diagram showing the configuration of the flyback type DC-DC converter. The flyback type DC-DC converter shown in FIG. 10 includes a transformer T, two switches Q1 and Q2, and an inverting circuit I1. The primary coil L1 of the transformer T is connected to the cathode of the fuel cell 110 at one end and to the switch Q1 at the other end. The switch Q1 is connected to the anode of the fuel cell 110 at one end. The secondary coil L2 of the transformer T is connected to the switch Q2 at one end and to the positive electrode of the rechargeable battery 150 at the other end. The coils L1 and L2 are disposed in such a manner so as to have the additive polarity.

The switch Q2 is connected to the negative electrode of the rechargeable battery 150 at one end. The inverting circuit I1 is connected between the switching controller 130*c* and the control terminal of the switch Q2. The switching controller 130*c* is connected to the control terminal of the switch Q1. The switches Q1 and Q2 come ON and go OFF in a complementary manner upon reception of the PWM signal.

The flyback type DC-DC converter configured in this manner stores energy in the transformer T when the switch Q1 comes ON, and outputs the energy stored in the transformer T when the switch Q1 goes OFF.

As has been described, according to the power supply of the thirteenth embodiment, because the duty ratio D is calculated in accordance with Equation (13) and the switch Q2 is provided, it is possible to achieve the same advantages achieved in the first embodiment even when the flyback type DC-DC converter is used as the DC-DC converter 120.

Fourteenth Embodiment

The power supply according to a fourteenth embodiment will now be described. Because the power supply of the fourteenth embodiment is of the same configuration as the power supply of the thirteenth embodiment, descriptions will be given using FIG. 9 and FIG. 10. The power supply of the fourteenth embodiment is characterized by calculating the duty ratio D using the target fuel cell current It instead of the target fuel cell voltage Vt.

The switching controller 130c calculates the duty ratio D of the PWM signal by performing a computation in accordance with Equation (14) using the voltage Vout measured by the voltmeter 140, the current Iout measured by the ammeter 170, and the target fuel cell current It set by the control portion 160c.

$$D[\%] = (It/Iout) \times [(2 \times L \times Iout/(Vout \times T))]^{1/2} \times 100 \quad (14)$$

where D is the duty ratio D, L is an inductance of the coil L1 shown in FIG. 10, and T is a cycle of the PWM signal.

As has been described, according to the power supply of the fourteenth embodiment, because the duty ratio D of the PWM signal is calculated in accordance with Equation (14) and the switch Q2 is connected, it is possible to achieve the same advantages achieved by the power supply of the first embodiment.

Fifteenth Embodiment

The power supply according to a fifteenth embodiment will now be described. Because the power supply of the fifteenth embodiment is of the same configuration as the power supply of the thirteenth embodiment, descriptions will be given using FIG. 9 and FIG. 10. The power supply of the fifteenth embodiment is characterized by calculating the duty ratio D by taking the power conversion efficiency η into account.

The switching controller 130c calculates the duty ratio D of the PWM signal by performing a computation in accordance with Equation (15) using the voltage Vout measured by the voltmeter 140, the current Iout measured by the ammeter 170, and the target fuel cell current It set by the control portion 160c.

$$D[\%] = (\eta \times It/Iout) \times [(2 \times L \times Iout/(Vout \times T))]^{1/2} \times 100 \quad (15)$$

where D is the duty ratio D, L is an inductance of the coil L1 shown in FIG. 10, and T is a cycle of the PWM signal.

As has been described, according to the power supply of the fifteenth embodiment, because the duty ratio D of the PWM signal is calculated in accordance with Equation (15) and the switch Q2 is connected, it is possible to achieve the same advantages achieved by the power supply of the first embodiment.

It should be appreciated that a DC-DC converter using a transformer, such as those of the forward type, the two-switch forward type, the active clamp forward type, the half bridge type, the push-pull type, the full bridge type, the phase shift type, and the ZVT type, can be adopted as the DC-DC converter in the power supply of the invention.

For any of the foregoing DC-DC converters, a function using the duty ratio D expressed by Equation (1-1) is known as the ratio (=Vout/Vin) of an input voltage Vin and an output voltage Vout. By modifying this function as has been described above, it is therefore possible to calculate the duty ratio D using the voltage Vout or the current Iout outputted from the DC-DC converter.

SUMMARY OF THE INVENTION

A power supply of the invention is characterized by comprising: a fuel cell; a DC-DC converter that adjusts a voltage outputted from the fuel cell, and then outputs the voltage to a load device connected thereto in parallel; signal generating means for generating a PWM signal that controls the DC-DC converter and outputting the PWM signal to the DC-DC converter; a rechargeable battery connected to the load device in parallel; and voltmeter means for measuring a voltage outputted from the DC-DC converter, wherein the signal generating means calculates a duty ratio of the PWM signal on the basis of a target fuel cell voltage indicating a target value of the voltage outputted from the fuel cell and a measured value of the voltage measured by the voltmeter means.

According to this configuration, a voltage outputted from the fuel cell is adjusted by the DC-DC converter, and then outputted to the load device connected thereto in parallel. The rechargeable battery charged with power outputted from the DC-DC converter is connected to the load device in parallel, and when power for the load device is insufficient, the rechargeable battery covers a shortfall of the power by discharging. A voltage outputted from the DC-DC converter is measured by the voltmeter means. The duty ratio of the PWM signal outputted to the DC-DC converter is calculated on the basis of the measured voltage and the target fuel cell voltage indicating the target value of the voltage outputted from the fuel cell. The DC-DC converter is controlled with the PWM signal having the duty ratio thus calculated. Hence, not only is it possible to obtain power necessary for the load device, but it is also possible to maintain the fuel cell at the constant operating point.

As has been described, because the DC-DC converter is controlled using a voltage outputted from the DC-DC converter without using a voltage outputted from the fuel cell as a negative feedback signal, it is possible to prevent the voltage outputted from the fuel cell from oscillating, which can in turn stabilize a generated output of the fuel cell while supplying the load device with necessary power. In addition, because it is possible to omit circuits, such as a circuit that compares the voltage of the fuel cell with the reference value and a circuit that varies the duty ratio in response to a difference between these values, the size of the circuitry can be reduced.

In the configuration described above, it is preferable that the signal generating means calculates the duty ratio of the PWM signal by performing a computation expressed F by Equation (1) using the target fuel cell voltage and the voltage measured by the voltmeter means, $$D[\%] = (1 - Vt/Vout) \times 100 \quad (1)$$

where D is the duty ratio, Vt is the target fuel cell voltage, and Vout is the voltage measured by the voltmeter means.

According to this configuration, because the duty ratio of the PWM signal is calculated in accordance with Equation (1), a generated output of the fuel cell can be stabilized when a boost type DC-DC converter is used as the DC-DC converter.

In the configuration described above, the DC-DC converter may be a buck type DC-DC converter, and the signal generating means may calculate the duty ratio of the PWM signal by performing a computation expressed by Equation (2) using the target fuel cell voltage and the voltage measured by the voltmeter means, $$D[\%]=(Vt/Vout)\times 100 \qquad (2)$$

where D is the duty ratio, Vt is the target fuel cell voltage, and Vout is the voltage measured by the voltmeter means.

According to this configuration, because the duty ratio of the PWM signal is calculated in accordance with Equation (2), a generated output of the fuel cell can be stabilized when a buck type DC-DC converter is used as the DC-DC converter.

In the configuration described above, the DC-DC converter may be an inverter type DC-DC converter, and the signal generating means may calculate the duty ratio of the PWM signal by performing a computation expressed by Equation (3) using the target fuel cell voltage and the voltage measured by the voltmeter means, $$D[\%]=(1/(1-Vt/Vout))\times 100 \qquad (3)$$

where D is the duty ratio, Vt is the target fuel cell voltage, and Vout is the voltage measured by the voltmeter means.

According to this configuration, because the duty ratio of the PWM signal is calculated in accordance with Equation (3), a generated output of the fuel cell can be stabilized when an inverter type DC-DC converter is used as the DC-DC converter.

In the configuration described above, the DC-DC converter may be a SEPIC type DC-DC converter, and the signal generating means may calculate the duty ratio of the PWM signal by performing a computation expressed by Equation (4) using the target fuel cell voltage and the voltage measured by the voltmeter means, $$D[\%]=(1/(1+Vt/Vout))\times 100 \qquad (4)$$

where D is the duty ratio, Vt is the target fuel cell voltage, and Vout is the voltage measured by the voltmeter means.

According to this configuration, because the duty ratio of the PWM signal is calculated in accordance with Equation (4), a generated output of the fuel cell can be stabilized when a SEPIC type DC-DC converter is used.

Also, a power supply of the invention is characterized by comprising: a fuel cell; a DC-DC converter that adjusts a voltage outputted from the fuel cell, and then outputs the voltage to a load device connected thereto in parallel; signal generating means for generating a PWM signal that controls the DC-DC converter and outputting the PWM signal to the DC-DC converter; a rechargeable battery connected to the load device in parallel; and ammeter means for measuring a current outputted from the DC-DC converter, wherein the signal generating means calculates a duty ratio of the PWM signal on the basis of a target fuel cell current indicating a target value of the current outputted from the fuel cell and a measured value of the current measured by the ammeter means.

According to this configuration, a voltage outputted from the fuel cell is adjusted by the DC-DC converter, and then outputted to the load device connected thereto in parallel. The rechargeable battery charged with power outputted from the DC-DC converter is connected to the load device in parallel, and when power for the load device is insufficient, the rechargeable battery covers a shortfall of the power by discharging. A current outputted from the DC-DC converter is measured by the ammeter means. The duty ratio of the PWM signal outputted to the DC-DC converter is calculated on the basis of the measured current and the target fuel cell current indicating the target value of the current outputted from the fuel cell. The DC-DC converter is controlled with the PWM signal having the duty ratio thus calculated. Hence, not only is it possible to obtain power necessary for the load device, but it is also possible to maintain the fuel cell at the constant operating point.

As has been described, because the DC-DC converter is controlled using a current outputted from the DC-DC converter without using a voltage outputted from the fuel cell as a negative feedback signal, it is possible to prevent the voltage outputted from the fuel cell from oscillating, which can in turn stabilize a generated output of the fuel cell while supplying the load device with necessary power. In addition, because it is possible to omit circuits, such as a circuit that compares the voltage of the fuel cell with the reference value and a circuit that varies the duty ratio in response to a difference between these values, the size of the circuitry can be reduced.

In the configuration described above, it is preferable that the DC-DC converter is a boost type DC-DC converter, and the signal generating means calculates the duty ratio of the PWM signal by performing a computation expressed by Equation (5) using the target fuel cell current and the current measured by the ammeter means, $$D[\%]=(1-Iout/It)\times 100 \qquad (5)$$

where D is the duty ratio, Iout is the current measured by the ammeter means, and It is the target fuel cell current.

According to this configuration, because the duty ratio of the PWM signal is calculated in accordance with Equation (5), a generated output of the fuel cell can be stabilized when a boost type DC-DC converter is used.

In the configuration described above, the DC-DC converter may be a buck type DC-DC converter, and the signal generating means may calculate the duty ratio of the PWM signal by performing a computation expressed by Equation (6) using the target fuel cell current and the current measured by the ammeter means, $$D[\%]=(Iout/It)\times 100 \qquad (6)$$

where D is the duty ratio, Iout is the current measured by the ammeter means, and It is the target fuel cell current.

According to this configuration, because the duty ratio of the PWM signal is calculated in accordance with Equation (6), a generated output of the fuel cell can be stabilized when a buck type DC-DC converter is used.

In the configuration described above, the DC-DC converter may be an inverter type DC-DC converter, and the signal generating means may calculate the duty ratio of the PWM signal by performing a computation expressed by Equation (7) using the target fuel cell current and the current measured by the ammeter means, $$D[\%]=(1/(1-Iout/It))\times 100 \qquad (7)$$

where D is the duty ratio, Iout is the current measured by the ammeter means, and It is the target fuel cell current.

According to this configuration, because the duty ratio of the PWM signal is calculated in accordance with Equation (7), a generated output of the fuel cell can be stabilized when an inverter type DC-DC converter is used.

In the configuration described above, the DC-DC converter may be a SEPIC type DC-DC converter, and the signal generating means may calculate the duty ratio of the PWM signal by performing a computation expressed by Equation (8) using the target fuel cell current and the current measured by the ammeter means, $$D[\%]=(1/(1+Iout/It))\times 100 \tag{8}$$

where D is the duty ratio, Iout is the current measured by the ammeter means, and It is the target fuel cell current.

According to this configuration, because the duty ratio of the PWM signal is calculated in accordance with Equation (8), a generated output of the fuel cell can be stabilized when a SEPIC type DC-DC converter is used.

In the configuration described above, the DC-DC converter may be a boost type DC-DC converter, and the signal generating means may calculate a power conversion efficiency indicating a power loss of the DC-DC converter on the basis of the target fuel cell current so as to calculate the duty ratio of the PWM signal by performing a computation expressed by Equation (9) using the calculated power conversion efficiency, the target fuel cell current, and the current measured by the ammeter means, $$D[\%]=(1-Iout/(\eta \times It))\times 100 \tag{9}$$

where D is the duty ratio, $\eta$ is the power conversion efficiency, Iout is the current measured by the ammeter means, and It is the target fuel cell current.

According to this configuration, because the duty ratio of the PWM signal is calculated in accordance with Equation (9) that takes the power conversion efficiency of the DC-DC converter into account, when a boost type DC-DC converter is used, it is possible to generate a PWM signal, for which a power loss caused by resistance of the transistor and the coil has been corrected. This configuration can in turn stabilize a generated output of the fuel cell.

In the configuration described above, the DC-DC converter may be a buck type DC-DC converter, and the signal generating means may calculate a power conversion efficiency indicating a power loss of the DC-DC converter on the basis of the target fuel cell current so as to calculate the duty ratio of the PWM signal by performing a computation expressed by Equation (10) using the calculated power conversion efficiency, the target fuel cell current, and the current measured by the ammeter means, $$D[\%]=(Iout/(\eta \times It))\times 100 \tag{10}$$

where D is the duty ratio, $\eta$ is the power conversion efficiency, Iout is the current measured by the ammeter means, and It is the target fuel cell current.

According to this configuration, because the duty ratio of the PWM signal is calculated in accordance with Equation (10) that takes the power conversion efficiency of the DC-DC converter into account, when a buck type DC-DC converter is used, it is possible to generate a PWM signal, for which a power loss caused by resistance of the transistor and the coil has been corrected. This configuration can in turn stabilize a generated output of the fuel cell.

In the configuration described above, the DC-DC converter may be an inverter type DC-DC converter, and the signal generating means may calculate a power conversion efficiency indicating a power loss of the DC-DC converter on the basis of the target fuel cell current so as to calculate the duty ratio of the PWM signal by performing a computation expressed by Equation (11) using the calculated power conversion efficiency, the target fuel cell current, and the current measured by the ammeter means, $$D[\%]=(1/(1-(Iout/(\eta \times It))))\times 100 \tag{11}$$

where D is the duty ratio, $\eta$ is the power conversion efficiency, Iout is the current measured by the ammeter means, and It is the target fuel cell current.

According to this configuration, because the duty ratio of the PWM signal is calculated in accordance with Equation (11) that takes the power conversion efficiency of the DC-DC converter into account, when an inverter type DC-DC converter is used, it is possible to generate a PWM signal, for which a power loss caused by resistance of the transistor and the coil has been corrected. This configuration can in turn stabilize a generated output of the fuel cell.

In the configuration described above, the DC-DC converter may be a SEPIC type DC-DC converter, and the signal generating means may calculate a power conversion efficiency indicating a power loss of the DC-DC converter on the basis of the target fuel cell current so as to calculate the duty ratio of the PWM signal by performing a computation expressed by Equation (12) using the calculated power conversion efficiency, the target fuel cell current, and the current measured by the ammeter means, $$D[\%]=(1/(1+(Iout/(\eta \times It))))\times 100 \tag{12}$$

where D is the duty ratio, $\eta$ is the power conversion efficiency, Iout is the current measured by the ammeter means, and It is the target fuel cell current.

According to this configuration, because the duty ratio of the PWM signal is calculated in accordance with Equation (12) that indicates the power conversion efficiency of the DC-DC converter, when a SEPIC type DC-DC converter is used, it is possible to generate a PWM signal, for which a power loss caused by resistance of the transistor and the coil has been corrected. This configuration can in turn stabilize a generated output of the fuel cell.

In the configuration described above, it is preferable that the boost type DC-DC converter includes: a coil connected to a cathode of the fuel cell at one end; a first switching element connected between the other end of the coil and an anode of the fuel cell; a second switching element connected between the other end of the coil and a negative electrode of the rechargeable battery; and an inverting circuit that inverts a logic of the PWM signal outputted from the signal generating means, and then outputs the PWM signal to the second switching element, and that the first and second switching elements come ON and go OFF in a complementary manner according to the PWM signal.

According to this configuration, instead of the rectifying element, such as a diode, the second switching element is connected to a point to which the rectifying element is connected in a boost type DC-DC converter in the related art. This configuration allows a current flowing through the coil to keep changing continuously without any interruption. It is thus possible to maintain a voltage outputted from the fuel cell at a constant level.

In the configuration described above, it is preferable that the buck type DC-DC converter includes: a first switching element connected to a cathode of the fuel cell at one end; a second switching element connected between the other end of the first switching element and an anode of the fuel cell; a coil connected between the other end of the first switching element and a negative electrode of the rechargeable battery; and an inverting circuit that inverts a logic of the PWM signal, and then outputs the PWM signal to the second switching element, and that the first and second switching elements come ON and go OFF in a complementary manner according to the PWM signal.

According to this configuration, instead of the rectifying element, such as a diode, the second switching element is connected to a point to which the rectifying element is connected in a buck type DC-DC converter in the related art. This configuration allows a current flowing through the coil to keep changing continuously without any interruption. It is thus possible to maintain a voltage outputted from the fuel cell at a constant level.

In the configuration described above, it is preferable that the inverter type DC-DC converter includes: a first switching element connected to a cathode of the fuel cell at one end; a coil connected between the other end of the first switching element and an anode of the fuel cell; a second switching element connected between the other end of the first switching element and a negative electrode of the rechargeable battery; and an inverting circuit that inverts a logic of the PWM signal, and then outputs the PWM signal to the second switching element, and that the first and second switching elements come ON and go OFF in a complementary manner according to the PWM signal.

According to this configuration, instead of the rectifying element, such as a diode, the second switching element is connected to a point to which the rectifying element is connected in an inverter type DC-DC converter in the related art. This configuration allows a current flowing through the coil to keep changing continuously without any interruption. It is thus possible to maintain a voltage outputted from the fuel cell at a constant level.

In the configuration described above, it is preferable that the SEPIC type DC-DC converter includes: a first coil connected to a cathode of the fuel cell at one end; a first switching element connected between the other end of the first coil and an anode of the fuel cell; a capacitor connected to the other end of the first coil at one end; a second coil connected between the other end of the capacitor and the anode of the fuel cell; a second switching element connected between the other end of the capacitor and a negative electrode of the rechargeable battery; and an inverting circuit that inverts a logic of the PWM signal, and then outputs the PWM signal to the second switching element, and that the first and second switching elements come ON and go OFF in a complementary manner according to the PWM signal.

According to this configuration, instead of the rectifying element, such as a diode, the second switching element is connected to a point to which the rectifying element is connected in a SEPIC type DC-DC converter in the related art. This configuration allows a current flowing through the coil to keep changing continuously without any interruption. It is thus possible to maintain a voltage outputted from the fuel cell at a constant level.

A power supply of the invention is characterized by comprising: a fuel cell; a DC-DC converter that adjusts a voltage outputted from the fuel cell, and then outputs the voltage to a load device connected thereto in parallel; signal generating means for generating a PWM signal that controls the DC-DC converter and outputting the PWM signal to the DC-DC converter; a rechargeable battery connected to the load device in parallel; voltmeter means for measuring a voltage outputted from the DC-DC converter; and ammeter means for measuring a current outputted from the DC-DC converter, wherein the signal generating means calculates a duty ratio of the PWM signal on the basis of a target fuel cell voltage indicating a target value of the voltage outputted from the fuel cell or a target fuel cell current indicating a target value of the current outputted from the fuel cell, a measured value of the voltage measured by the voltmeter means, and a measured value of the current measured by the ammeter means.

According to this configuration, a voltage outputted from the fuel cell is adjusted by the DC-DC converter, and then outputted to the load device connected thereto in parallel. The rechargeable battery charged with power outputted from the DC-DC converter is connected to the load device in parallel, and when power for the load device is insufficient, the rechargeable battery covers a shortfall of the power by discharging. A voltage and a current outputted from the DC-DC converter are measured by the voltmeter means and the ammeter means, respectively. The duty ratio of the PWM signal outputted to the DC-DC converter is calculated on the basis of the measured voltage and current, and the target fuel cell voltage indicating the target value of the voltage outputted from the fuel cell or the target fuel cell current indicating the target value of the current outputted from the fuel cell. The DC-DC converter is controlled with the PWM signal having the duty ratio thus calculated. Hence, not only is it possible to obtain power necessary for the load device, but it is also possible to maintain the fuel cell at the constant operating point.

As has been described, because the DC-DC converter is controlled using a voltage and a current outputted from the DC-DC converter without using a voltage outputted from the fuel cell as a negative feedback signal, it is possible to prevent the voltage outputted from the fuel cell from oscillating, which can in turn stabilize a generated output of the fuel cell while supplying the load device with necessary power. In addition, because it is possible to omit circuits, such as a circuit that compares the voltage of the fuel cell with the reference value and a circuit that varies the duty ratio in response to a difference between these values, the size of the circuitry can be reduced.

In the configuration described above, it is preferable that the DC-DC converter is a flyback type DC-DC converter including a transformer, and that the signal generating means calculates the duty ratio of the PWM signal by performing a computation expressed by Equation (13) using the voltage measured by the voltmeter means, the current measured by the ammeter means, and the target fuel cell voltage, $$D[\%]=(Vout/Vt)\times[(2\times L\times Iout/(Vout\times T))]^{1/2}\times 100 \qquad (13)$$

where D is the duty ratio, L is an inductance of a primary coil forming the transformer, Vt is the target fuel cell voltage, Vout is the voltage measured by the voltmeter means, Iout is the current measured by the ammeter means, and T is a cycle of the PWM signal.

According to this configuration, because the duty ratio of the PWM signal is calculated in accordance with Equation (13), a generated output of the fuel cell can be stabilized when a flyback type DC-DC converter is used.

In the configuration described above, it is preferable that the DC-DC converter is a flyback type DC-DC converter including a transformer, and that the signal generating means calculates the duty ratio of the PWM signal by performing a computation expressed by Equation (14) using the voltage measured by the voltmeter means, the current measured by the ammeter means, and the target fuel cell current indicating the target value of the current outputted from the fuel cell, $$D[\%]=(It/Iout)\times[(2\times L\times Iout/(Vout\times T))]^{1/2}\times 100 \qquad (14)$$

where D is the duty ratio, L is an inductance of a primary coil in the transformer, It is the target fuel cell current, Vout is the voltage measured by the voltmeter means, Iout is the current measured by the ammeter means, and T is a cycle of the PWM signal.

According to this configuration, because the duty ratio of the PWM signal is calculated in accordance with Equation (14), a generated output of the fuel cell can be stabilized when a flyback type DC-DC converter is used.

In the configuration described above, it is preferable that the DC-DC converter is a flyback type DC-DC converter including a transformer, and that the signal generating means calculates a power conversion efficiency indicating a power loss of the DC-DC converter on the basis of the target fuel cell current so as to calculate the duty ratio of the PWM signal by performing a computation expressed by Equation (15) using the target fuel cell current and the calculated power conversion efficiency, $$D[\%]=(\eta \times It/Iout) \times [(2 \times L \times Iout/(Vout \times T))]^{1/2} \times 100 \qquad (15)$$

where $\eta$ is the power conversion efficiency, L is an inductance of a primary coil in the transformer, It is the target fuel cell current, Vout is the voltage measured by the voltmeter means, Iout is the current measured by the ammeter means, and T is a cycle of the PWM signal.

According to this configuration, because the duty ratio of the PWM signal is calculated in accordance with Equation (15) that takes the power conversion efficiency of the DC-DC converter into account, it is possible to generate a PWM signal, for which a power loss caused by resistance of the transistor and the coil has been corrected. This configuration can in turn stabilize a generated output of the fuel cell.

In the configuration described above, it is preferable that the flyback type DC-DC converter includes: the transformer having the primary coil connected to a cathode of the fuel cell at one end and a secondary coil connected to a positive electrode of the rechargeable battery at one end; a first switching element connected between the other end of the primary coil and an anode of the fuel cell; a second switching element connected between the one end of the secondary coil and a negative electrode of the rechargeable battery; and an inverting circuit that inverts a logic of the PWM signal, and then outputs the PWM signal to the second switching element, and that the first and second switching elements come ON and go OFF in a complementary manner according to the PWM signal.

According to this configuration, instead of the rectifying element, such as a diode, the second switching element is connected to a point to which the rectifying element is connected in a flyback type DC-DC converter in the related art. This configurational lows a current flowing through the coil to keep changing continuously without any interruption. It is thus possible to maintain a voltage outputted from the fuel cell at a constant level.

In the configuration described above, it is preferable that the fuel cell is a direct methanol fuel cell of a fuel non-circulation type.

According to this configuration, it is possible to stabilize a generated output by stabilizing the operating point of a direct methanol fuel cell of a fuel non-circulation type suitable for achieving a size reduction. It is therefore possible to provide a compact power supply useful for a mobile electronic device, such as a notebook computer.

INDUSTRIAL APPLICABILITY

According to the invention, it is possible to provide a power supply capable of stabilizing a generated output of the fuel cell.

The invention claimed is:

1. A power supply comprising:
    a fuel cell;
    a DC-DC converter that adjusts a voltage outputted from the fuel cell, and then outputs the voltage to a load device connected thereto in parallel;
    a signal generator for generating a PWM signal that controls the DC-DC converter and outputting the PWM signal to the DC-DC converter;
    a rechargeable battery connected to the load device in parallel; and
    a voltmeter for measuring a voltage outputted from the DC-DC converter,
    wherein the signal generator calculates a duty ratio of the PWM signal on the basis of a target fuel cell voltage indicating a target value of the voltage outputted from the fuel cell and a measured value of the voltage measured by the voltmeter,
    the DC-DC converter is a boost type DC-DC converter; and
    the signal generator calculates the duty ratio of the PWM signal by performing a computation expressed by Equation (1) using the target fuel cell voltage and the voltage measured by the voltmeter, $$D[\%]=(1-Vt/Vout) \times 100 \qquad (1):$$

where D is the duty ratio, Vt is the target fuel cell voltage, and Vout is the voltage measured by the voltmeter.

2. The power supply according to claim 1, wherein the boost type DC-DC converter includes:
    a coil connected to a cathode of the fuel cell at one end;
    a first switching element connected between the other end of the coil and an anode of the fuel cell;
    a second switching element connected between the other end of the coil and a negative electrode of the rechargeable battery; and
    an inverting circuit that inverts a logic of the PWM signal outputted from the signal generator, and then outputs the PWM signal to the second switching element, and wherein the first and second switching elements come ON and go OFF in a complementary manner according to the PWM signal.

3. A power supply comprising:
    a fuel cell;
    a DC-DC converter that adjusts a voltage outputted from the fuel cell, and then outputs the voltage to a load device connected thereto in parallel;
    a signal generator for generating a PWM signal that controls the DC-DC converter and outputting the PWM signal to the DC-DC converter;
    a rechargeable battery connected to the load device in parallel; and
    a voltmeter for measuring a voltage outputted from the DC-DC converter,
    wherein the signal generator calculates a duty ratio of the PWM signal on the basis of a target fuel cell voltage indicating a target value of the voltage outputted from the fuel cell and a measured value of the voltage measured by the voltmeter,
    the DC-DC converter is a buck type DC-DC converter; and
    the signal generator calculates the duty ratio of the PWM signal by performing a computation expressed by Equation (2) using the target fuel cell voltage and the voltage measured by the voltmeter, $$D[\%](Vt/Vout) \times 100 \qquad (2):$$

where D is the duty ratio, Vt is the target fuel cell voltage, and Vout is the voltage measured by the voltmeter.

4. The power supply according to claim 3, wherein the buck type DC-DC converter includes:
- a first switching element connected to a cathode of the fuel cell at one end;
- a second switching element connected between the other end of the first switching element and an anode of the fuel cell;
- a coil connected between the other end of the first switching element and a negative electrode of the rechargeable battery; and
- an inverting circuit that inverts a logic of the PWM signal, and then outputs the PWM signal to the second switching element, and
- wherein the first and second switching elements come ON and go OFF in a complementary manner according to the PWM signal.

5. A power supply comprising:
- a fuel cell;
- a DC-DC converter that adjusts a voltage outputted from the fuel cell, and then outputs the voltage to a load device connected thereto in parallel;
- a signal generator for generating a PWM signal that controls the DC-DC converter and outputting the PWM signal to the DC-DC converter;
- a rechargeable battery connected to the load device in parallel; and
- a voltmeter for measuring a voltage outputted from the DC-DC converter,
- wherein the signal generator calculates a duty ratio of the PWM signal on the basis of a target fuel cell voltage indicating a target value of the voltage outputted from the fuel cell and a measured value of the voltage measured by the voltmeter,
- the DC-DC converter is an inverter type DC-DC converter; and
- the signal generator calculates the duty ratio of the PWM signal by performing a computation expressed by Equation (3) using the target fuel cell voltage and the voltage measured by the voltmeter, $$D[\%]=(1/(1-Vt/Vout))\times 100 \qquad (3):$$

where D is the duty ratio, Vt is the target fuel cell voltage, and Vout is the voltage measured by the voltmeter.

6. The power supply according to claim 5, wherein the inverter type DC-DC converter includes:
- a first switching element connected to a cathode of the fuel cell at one end;
- a coil connected between the other end of the first switching element and an anode of the fuel cell;
- a second switching element connected between the other end of the first switching element and a negative electrode of the rechargeable battery; and
- an inverting circuit that inverts a logic of the PWM signal, and then outputs the PWM signal to the second switching element, and
- wherein the first and second switching elements come ON and go OFF in a complementary manner according to the PWM signal.

7. A power supply comprising:
- a fuel cell;
- a DC-DC converter that adjusts a voltage outputted from the fuel cell, and then outputs the voltage to a load device connected thereto in parallel;
- a signal generator for generating a PWM signal that controls the DC-DC converter and outputting the PWM signal to the DC-DC converter;
- a rechargeable battery connected to the load device in parallel; and
- a voltmeter for measuring a voltage outputted from the DC-DC converter,
- wherein the signal generator calculates a duty ratio of the PWM signal on the basis of a target fuel cell voltage indicating a target value of the voltage outputted from the fuel cell and a measured value of the voltage measured by the voltmeter,
- the DC-DC converter is a SEPIC type DC-DC converter; and
- the signal generator calculates the duty ratio of the PWM signal by performing a computation expressed by Equation (4) using the target fuel cell voltage and the voltage measured by the voltmeter, $$D[\%]=(1/(1+Vt/Vout))\times 100 \qquad (4):$$

where D is the duty ratio, Vt is the target fuel cell voltage, and Vout is the voltage measured by the voltmeter.

8. The power supply according to claim 7, wherein the SEPIC type DC-DC converter includes:
- a first coil connected to a cathode of the fuel cell at one end;
- a first switching element connected between the other end of the first coil and an anode of the fuel cell;
- a capacitor connected to the other end of the first coil at one end;
- a second coil connected between the other end of the capacitor and the anode of the fuel cell;
- a second switching element connected between the other end of the capacitor and a negative electrode of the rechargeable battery; and
- an inverting circuit that inverts a logic of the PWM signal, and then outputs the PWM signal to the second switching element, and
- wherein the first and second switching elements come ON and go OFF in a complementary manner according to the PWM signal.

9. A power supply comprising:
- a fuel cell;
- a DC-DC converter that adjusts a voltage outputted from the fuel cell, and then outputs the voltage to a load device connected thereto in parallel;
- a signal generator for generating a PWM signal that controls the DC-DC converter and outputting the PWM signal to the DC-DC converter;
- a rechargeable battery connected to the load device in parallel; and
- an ammeter for measuring a current outputted from the DC-DC converter,
- wherein the signal generator calculates a duty ratio of the PWM signal on the basis of a target fuel cell current indicating a target value of a current outputted from the fuel cell and a measured value of the current measured by the ammeter, and
- wherein the signal generator calculates the duty ratio of the PWM signal by performing a computation expressed by one of Equations (5), (6), (7), and (8) using the target fuel cell current and the current measured by the ammeter, $$D[\%]=(1-Iout/It)\times 100, \qquad (5):$$

$$D[\%]=(Iout/It)\times 100, \qquad (6):$$

$$D[\%]=(1/(1-Iout/It))\times 100, \qquad (7):$$

$$D[\%]=(1/(1Iout/It))\times 100, \qquad (8):$$

where D is the duty ratio, Iout is the current measured by the ammeter, and It is the target fuel cell current.

10. The power supply according to claim 9, wherein:
the DC-DC converter is a boost type DC-DC converter.

11. The power supply according to claim 9, wherein:
the DC-DC converter is a buck type DC-DC converter.

12. The power supply according to claim 9, wherein:
the DC-DC converter is an inverter type DC-DC converter.

13. The power supply according to claim 9, wherein:
the DC-DC converter is a SEPIC type DC-DC converter.

14. The power supply according to claim 9, wherein:
the fuel cell is a direct methanol fuel cell of a fuel non-circulation type.

15. A power supply comprising:
a fuel cell;
a DC-DC converter that adjusts a voltage outputted from the fuel cell, and then outputs the voltage to a load device connected thereto in parallel;
a signal generator for generating a PWM signal that controls the DC-DC converter and outputting the PWM signal to the DC-DC converter;
a rechargeable battery connected to the load device in parallel; and
an ammeter for measuring a current outputted from the DC-DC converter,
wherein the signal generator calculates a duty ratio of the PWM signal on the basis of a target fuel cell current indicating a target value of a current outputted from the fuel cell and a measured value of the current measured by the ammeter, and
wherein the signal generator calculates a power conversion efficiency indicating a power loss of the DC-DC converter on the basis of the target fuel cell current so as to calculate the duty ratio of the PWM signal by performing a computation expressed by one of Equations (9), (10), (11), and (12) using the calculated power conversion efficiency, the target fuel cell current, and the current measured by the ammeter, $$D[\%]=(1-Iout/(\eta \times It)) \times 100 \qquad (9):$$

$$D[\%]=(Iout/(\eta \times It)) \times 100, \qquad (10):$$

$$D[\%]=(1/(1-(Iout/(\eta \times It)))) \times 100, \qquad (11):$$

$$D[\%]=(1/(1+(Iout/(\eta \times It)))) \times 100 \qquad (12):$$

where D is the duty ratio, $\eta$ is the power conversion efficiency, Iout is the current measured by the ammeter, and It is the target fuel cell current.

16. The power supply according to claim 15, wherein:
the DC-DC converter is a buck type DC-DC converter.

17. The power supply according to claim 15, wherein:
the DC-DC converter is an inverter type DC-DC converter.

18. The power supply according to claim 15, wherein:
the DC-DC converter is a SEPIC type DC-DC converter.

19. A power supply comprising:
a fuel cell;
a DC-DC converter that adjusts a voltage outputted from the fuel cell, and then outputs the voltage to a load device connected thereto in parallel;
a signal generator for generating a PWM signal that controls the DC-DC converter and outputting the PWM signal to the DC-DC converter;
a rechargeable battery connected to the load device in parallel;
a voltmeter for measuring a voltage outputted from the DC-DC converter; and
an ammeter for measuring a current outputted from the DC-DC converter,
wherein the signal generator calculates a duty ratio of the PWM signal on the basis of a target fuel cell voltage indicating a target value of the voltage outputted from the fuel cell or a target fuel cell current indicating a target value of a current outputted from the fuel cell, a measured value of the voltage measured by the voltmeter, and a measured value of the current measured by the ammeter, and
wherein the signal generator calculates the duty ratio of the PWM signal by performing a computation expressed by Equation (13) using the voltage measured by the voltmeter, the current measured by the ammeter, and the target fuel cell voltage, $$D[\%]=(Vout/Vt) \times [(2 \times L \times Iout/(Vout \times T))]^{1/2} \times 100 \qquad (13):$$

where D is the duty ratio, L is an inductance of a primary coil forming the transformer, Vt is the target fuel cell voltage, Vout is the voltage measured by the voltmeter, Iout is the current measured by the ammeter, and T is a cycle of the PWM signal.

20. The power supply according to claim 19, wherein:
the DC-DC converter is a flyback type DC-DC converter including a transformer.

21. The power supply according to claim 20, wherein the flyback type DC-DC converter includes:
the transformer having the primary coil connected to a cathode of the fuel cell at one end and a secondary coil connected to a positive electrode of the rechargeable battery at one end;
a first switching element connected between the other end of the primary coil and an anode of the fuel cell;
a second switching element connected between the one end of the secondary coil and a negative electrode of the rechargeable battery; and
an inverting circuit that inverts a logic of the PWM signal, and then outputs the PWM signal to the second switching element, and
wherein the first and second switching elements come ON and go OFF in a complementary manner according to the PWM signal.

22. A power supply comprising:
a fuel cell;
a DC-DC converter that adjusts a voltage outputted from the fuel cell, and then outputs the voltage to a load device connected thereto in parallel;
a signal generator for generating a PWM signal that controls the DC-DC converter and outputting the PWM signal to the DC-DC converter;
a rechargeable battery connected to the load device in parallel;
a voltmeter for measuring a voltage outputted from the DC-DC converter; and
an ammeter for measuring a current outputted from the DC-DC converter,
wherein the signal generator calculates a duty ratio of the PWM signal on the basis of a target fuel cell voltage indicating a target value of the voltage outputted from the fuel cell or a target fuel cell current indicating a target value of a current outputted from the fuel cell, a measured value of the voltage measured by the voltmeter, and a measured value of the current measured by the ammeter, and
wherein the signal generator calculates the duty ratio of the PWM signal by performing a computation expressed by one of Equations (14) and (15) using the voltage measured by the voltmeter, the current measured by the ammeter, and the target fuel cell current indicating the target value of the current outputted from the fuel cell, $$D[\%] = (It/Iout) \times [(2 \times L \times Iout/(Vout \times T))]^{1/2} \times 100, \quad (14)$$

$$D[\%](\eta \times It/Iout) \times [(2 \times L \times Iout/(Vout \times T))] \times 100 \quad (15):$$

where D is the duty ratio, L is an inductance of a primary coil in the transformer, It is the target fuel cell current, Vout is the voltage measured by the voltmeter, Iout is the current measured by the ammeter, and T is a cycle of the PWM signal.

23. The power supply according to claim 22, wherein:
the DC-DC converter is a flyback type DC-DC converter including a transformer.

* * * * *